(12) United States Patent
Newman

(10) Patent No.: US 10,363,938 B2
(45) Date of Patent: Jul. 30, 2019

(54) AUTHENTICATION USING ELECTROMAGNET SIGNAL DETECTION

(71) Applicant: NIO USA, Inc., San Jose, CA (US)

(72) Inventor: Austin L. Newman, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 188 days.

(21) Appl. No.: 15/392,065

(22) Filed: Dec. 28, 2016

(65) Prior Publication Data

US 2018/0126993 A1 May 10, 2018

Related U.S. Application Data

(60) Provisional application No. 62/418,554, filed on Nov. 7, 2016.

(51) Int. Cl.
| | | |
|---|---|---|
| *G01C 21/00* | (2006.01) | |
| *B60W 30/188* | (2012.01) | |
| *H02P 6/04* | (2016.01) | |
| *B60W 10/08* | (2006.01) | |
| *H02P 31/00* | (2006.01) | |

(52) U.S. Cl.
CPC .......... *B60W 30/188* (2013.01); *B60W 10/08* (2013.01); *H02P 6/04* (2013.01); *H02P 31/00* (2013.01); *B60L 2240/421* (2013.01); *B60W 2540/10* (2013.01); *B60W 2710/021* (2013.01); *B60Y 2200/92* (2013.01); *Y02T 10/642* (2013.01); *Y02T 10/7258* (2013.01); *Y10S 903/903* (2013.01)

(58) Field of Classification Search
CPC ............... B60W 30/188; B60W 10/08; B60W 2710/021; B60W 2540/10; B60L 15/20; H02P 6/04; B60Y 2200/92; Y10S 903/903

See application file for complete search history.

(56) References Cited

U.S. PATENT DOCUMENTS

| | | | | |
|---|---|---|---|---|
| 4,325,199 A | * | 4/1982 | McEdwards | A63H 17/34 446/130 |
| 4,363,999 A | * | 12/1982 | Preikschat | B60L 11/1805 318/53 |
| 4,819,758 A | * | 4/1989 | Greene | G05D 1/0255 180/168 |
| 5,751,126 A | * | 5/1998 | Hellinger | B66C 13/063 187/292 |
| 2003/0042890 A1 | * | 3/2003 | Normann | B60C 23/0416 324/162 |
| 2013/0082626 A1 | * | 4/2013 | Daigle | B60L 11/08 318/52 |
| 2013/0320900 A1 | * | 12/2013 | Daigle | B61C 15/12 318/434 |
| 2015/0193992 A1 | * | 7/2015 | Kumar | G07C 5/0808 701/29.2 |
| 2016/0129355 A1 | * | 5/2016 | Erhart | A63H 15/06 446/456 |

* cited by examiner

*Primary Examiner* — Ian Jen
(74) *Attorney, Agent, or Firm* — Sheridan Ross P.C.

(57) ABSTRACT

Systems of an electrical vehicle and the operations thereof are provided. In particular, a motor controller is described. The motor controller is described to have the ability to emit an electromagnetic signal via a motor of the electrical vehicle. The motor controller may be designed to control a speed of the motor's rotation so as to control a frequency of the emitted electromagnetic signal.

19 Claims, 18 Drawing Sheets

US 10,363,938 B2

AUTHENTICATION USING ELECTROMAGNET SIGNAL DETECTION

FIELD

The present disclosure is generally directed to vehicle systems, in particular, toward electric and/or hybrid-electric vehicles.

BACKGROUND

In recent years, transportation methods have changed substantially. This change is due in part to a concern over the limited availability of natural resources, a proliferation in personal technology, and a societal shift to adopt more environmentally-friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
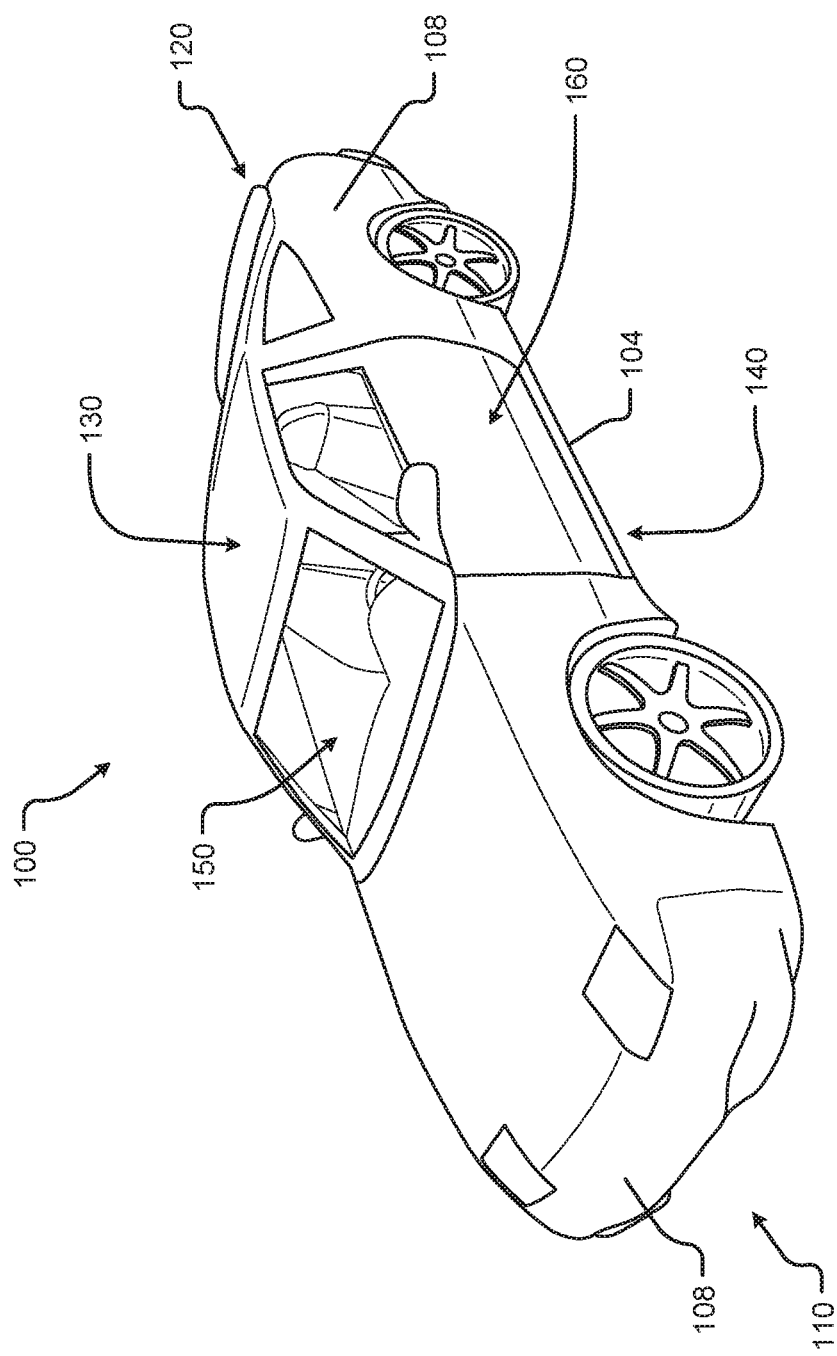
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

Figure 2:
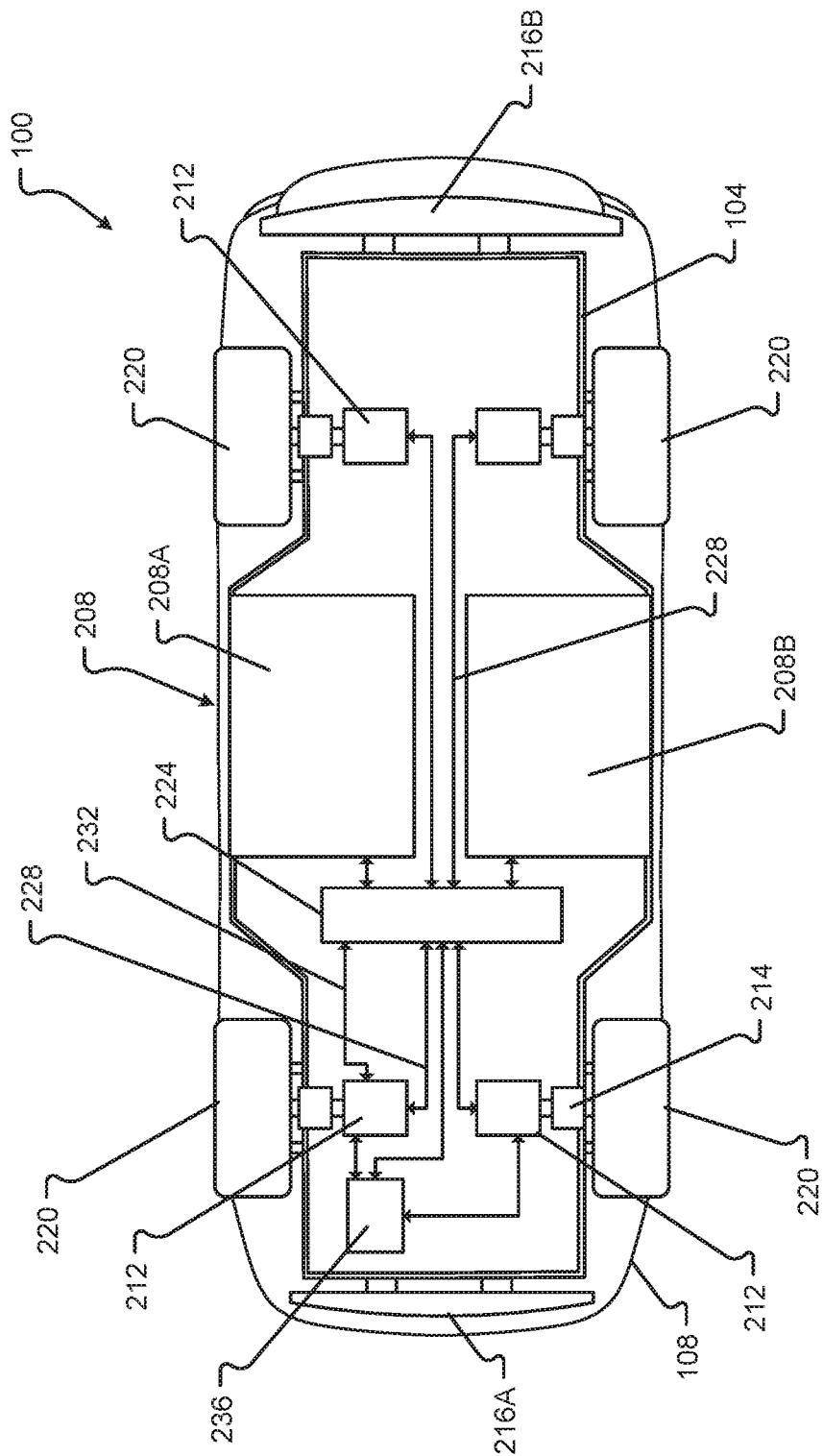
FIG. 2 shows a plan view of the vehicle in accordance with at least some embodiments of the present disclosure.

Referring now to FIG. 2, a plan view of a vehicle 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 104 of the vehicle 100. The frame 104 may comprise a separate frame and body construction (i.e., body-on-frame construction), a unitary frame and body construction (i.e., a unibody construction), or any other construction defining the structure of the vehicle 100. The frame 104 may be made from one or more materials including, but in no way limited to steel, titanium, aluminum, carbon fiber, plastic, polymers, etc., and/or combinations thereof. In some embodiments, the frame 104 may be formed, welded, fused, fastened, pressed, etc., combinations thereof, or otherwise shaped to define a physical structure and strength of the vehicle 100. In any event, the frame 104 may comprise one or more surfaces, connections, protrusions, cavities, mounting points, tabs, slots, or other features that are configured to receive other components that make up the vehicle 100. For example, the body panels 108, powertrain subsystem, controls systems, interior components, communications subsystem, and safety subsystem may interconnect with, or attach to, the frame 104 of the vehicle 100.

The frame 104 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources 208A, 208B, motors 212, engines, safety equipment, controllers, user interfaces, interiors exterior components, body panels 108, bumpers 216, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, the frame 104 may include slides, receptacles, cavities, protrusions, and/or a number of other features that allow for quick exchange of system components. In one embodiment, the frame 104 may include tray or ledge features, mechanical interconnection features, locking mechanisms, retaining mechanisms, etc., and/or combinations thereof. In some embodiments, it may be beneficial to quickly remove a used power source 208A, 208B (e.g., battery unit, capacitor unit, etc.) from the vehicle 100 and replace the used power source 208A, 208B with a charged or new power source. Continuing this example, the power source 208A, 208B may include selectively interchangeable features that interconnect with the frame 104 or other portion of the vehicle 100.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 212 of the vehicle 100. The electric motors 212 are configured to convert electrical energy provided by a power source into mechanical energy. This mechanical energy may be in the form of a rotational or other output force that is configured to propel or otherwise provide a motive force for the vehicle 100.

In some embodiments, the vehicle 100 may include one or more drive wheels 220 that are driven by the one or more electric motors 212 and motor controllers 214. In some cases, the vehicle 100 may include an electric motor 212 configured to provide a driving force for each drive wheel 220. In other cases, a single electric motor 212 may be configured to share an output force between two or more drive wheels 220 via one or more power transmission components. It is an aspect of the present disclosure that the powertrain may include one or more power transmission components, motor controllers 214, and/or power controllers that can provide a controlled output of power to one or more of the drive wheels 220 of the vehicle 100. The power transmission components, power controllers, or motor controllers 214 may be controlled by at least one other vehicle controller or computer system as described herein.

As provided above, the powertrain of the vehicle 100 may include one or more power sources 208A, 208B. These one or more power sources 208A, 208B may be configured to provide drive power, system and/or subsystem power, accessory power, etc. While described herein as a single power source 208 for sake of clarity, embodiments of the present disclosure are not so limited. For example, it should be appreciated that independent, different, or separate power sources 208A, 208B may provide power to various systems of the vehicle 100. For instance, a drive power source may be configured to provide the power for the one or more electric motors 212 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 208A, 208B in this manner may provide a number of benefits over conventional vehicle systems. For example, separating the power sources 208A, 208B allow one power source 208 to be removed and/or replaced independently without requiring that power be removed from all systems and/or subsystems of the vehicle 100 during a power source 208 removal/replacement. For instance, one or more of the accessories, communications, safety equipment, and/or backup power systems, etc., may be maintained even when a particular power source 208A, 208B is depleted, removed, or becomes otherwise inoperable.

In some embodiments, the drive power source may be separated into two or more cells, units, sources, and/or systems. By way of example, a vehicle 100 may include a first drive power source 208A and a second drive power source 208B. The first drive power source 208A may be operated independently from or in conjunction with the second drive power source 208B and vice versa. Continuing this example, the first drive power source 208A may be removed from a vehicle while a second drive power source 208B can be maintained in the vehicle 100 to provide drive power. This approach allows the vehicle 100 to significantly reduce weight (e.g., of the first drive power source 208A, etc.) and improve power consumption, even if only for a temporary period of time. In some cases, a vehicle 100 running low on power may automatically determine that pulling over to a rest area, emergency lane, and removing, or "dropping off," at least one power source 208A, 208B may reduce enough weight of the vehicle 100 to allow the vehicle 100 to navigate to the closest power source replacement and/or charging area. In some embodiments, the removed, or "dropped off," power source 208A may be collected by a collection service, vehicle mechanic, tow truck, or even another vehicle or individual.

The power source 208 may include a GPS or other geographical location system that may be configured to emit a location signal to one or more receiving entities. For instance, the signal may be broadcast or targeted to a specific receiving party. Additionally or alternatively, the power source 208 may include a unique identifier that may be used to associate the power source 208 with a particular vehicle 100 or vehicle user. This unique identifier may allow an efficient recovery of the power source 208 dropped off. In some embodiments, the unique identifier may provide information for the particular vehicle 100 or vehicle user to be billed or charged with a cost of recovery for the power source 208.

The power source 208 may include a charge controller 224 that may be configured to determine charge levels of the power source 208, control a rate at which charge is drawn from the power source 208, control a rate at which charge is added to the power source 208, and/or monitor a health of the power source 208 (e.g., one or more cells, portions, etc.). In some embodiments, the charge controller 224 or the power source 208 may include a communication interface. The communication interface can allow the charge controller 224 to report a state of the power source 208 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers or computers of the vehicle 100 or a communication device that is separate and/or apart from the vehicle 100.

The powertrain includes one or more power distribution systems configured to transmit power from the power source 208 to one or more electric motors 212 in the vehicle 100. The power distribution system may include electrical interconnections 228 in the form of cables, wires, traces, wireless power transmission systems, etc., and/or combinations thereof. It is an aspect of the present disclosure that the vehicle 100 include one or more redundant electrical interconnections 232 of the power distribution system. The redundant electrical interconnections 232 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 232 is being used and/or damage has occurred to a particular area of the vehicle electrical system. In any event, the one or more redundant electrical interconnections 232 may be configured along completely different routes than the electrical interconnections 228 and/or include different modes of failure than the electrical interconnections 228 to, among other things, prevent a total interruption power distribution in the event of a failure.

In some embodiments, the power distribution system may include an energy recovery system 236. This energy recovery system 236, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 236, when a vehicle 100 brakes, at least a portion of the kinetic energy is converted into electrical and/or mechanical energy for storage. Mechanical energy may be stored as mechanical movement (e.g., in a flywheel, etc.) and electrical energy may be stored in batteries, capacitors, and/or some other electrical storage system. In some embodiments, electrical energy recovered may be stored in the power source 208. For example, the recovered electrical energy may be used to charge the power source 208 of the vehicle 100.

The vehicle 100 may include one or more safety systems. Vehicle safety systems can include a variety of mechanical and/or electrical components including, but in no way limited to, low impact or energy-absorbing bumpers 216A, 216B, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 3:
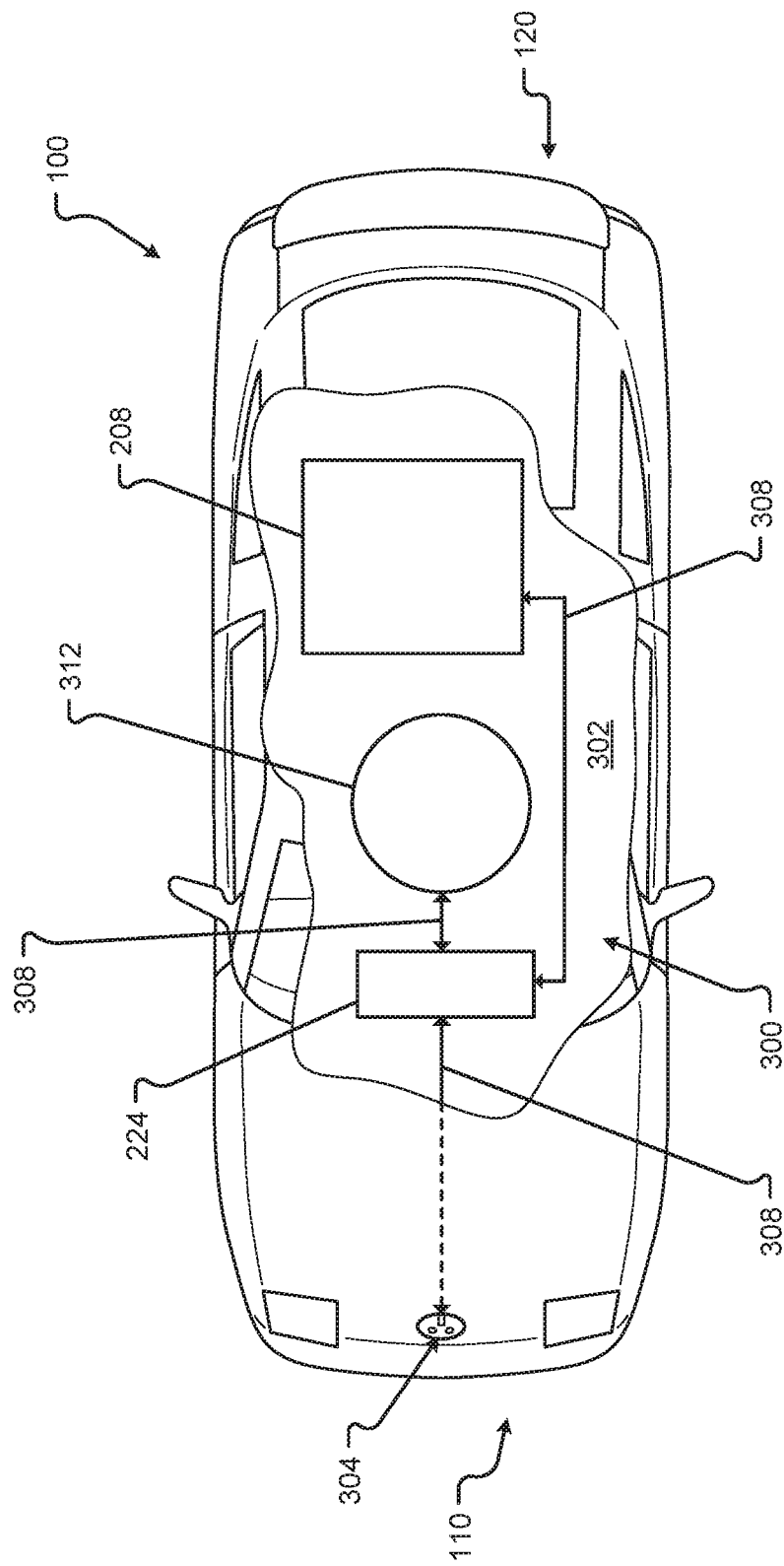
FIG. 3 shows a plan view of the vehicle in accordance with embodiments of the present disclosure

FIG. 3 shows a plan view of the vehicle 100 in accordance with embodiments of the present disclosure. In particular, FIG. 3 shows a broken section 302 of a charging system 300 for the vehicle 100. The charging system 300 may include a plug or receptacle 304 configured to receive power from an external power source (e.g., a source of power that is external to and/or separate from the vehicle 100, etc.). An example of an external power source may include the standard industrial, commercial, or residential power that is provided across power lines. Another example of an external power source may include a proprietary power system configured to provide power to the vehicle 100. In any event, power received at the plug/receptacle 304 may be transferred via at least one power transmission interconnection 308. Similar, if not identical, to the electrical interconnections 228 described above, the at least one power transmission interconnection 308 may be one or more cables, wires, traces, wireless power transmission systems, etc., and/or combinations thereof. Electrical energy in the form of charge can be transferred from the external power source to the charge controller 224. As provided above, the charge controller 224 may regulate the addition of charge to at least one power source 208 of the vehicle 100 (e.g., until the at least one power source 208 is full or at a capacity, etc.).

In some embodiments, the vehicle 100 may include an inductive charging system and inductive charger 312. The inductive charger 312 may be configured to receive electrical energy from an inductive power source external to the vehicle 100. In one embodiment, when the vehicle 100 and/or the inductive charger 312 is positioned over an inductive power source external to the vehicle 100, electrical energy can be transferred from the inductive power source to the vehicle 100. For example, the inductive charger 312 may receive the charge and transfer the charge via at least one power transmission interconnection 308 to the charge controller 324 and/or the power source 208 of the vehicle 100. The inductive charger 312 may be concealed in a portion of the vehicle 100 (e.g., at least partially protected by the frame 104, one or more body panels 108, a shroud, a shield, a protective cover, etc., and/or combinations thereof) and/or may be deployed from the vehicle 100. In some embodiments, the inductive charger 312 may be configured to receive charge only when the inductive charger 312 is deployed from the vehicle 100. In other embodiments, the inductive charger 312 may be configured to receive charge while concealed in the portion of the vehicle 100.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 4:
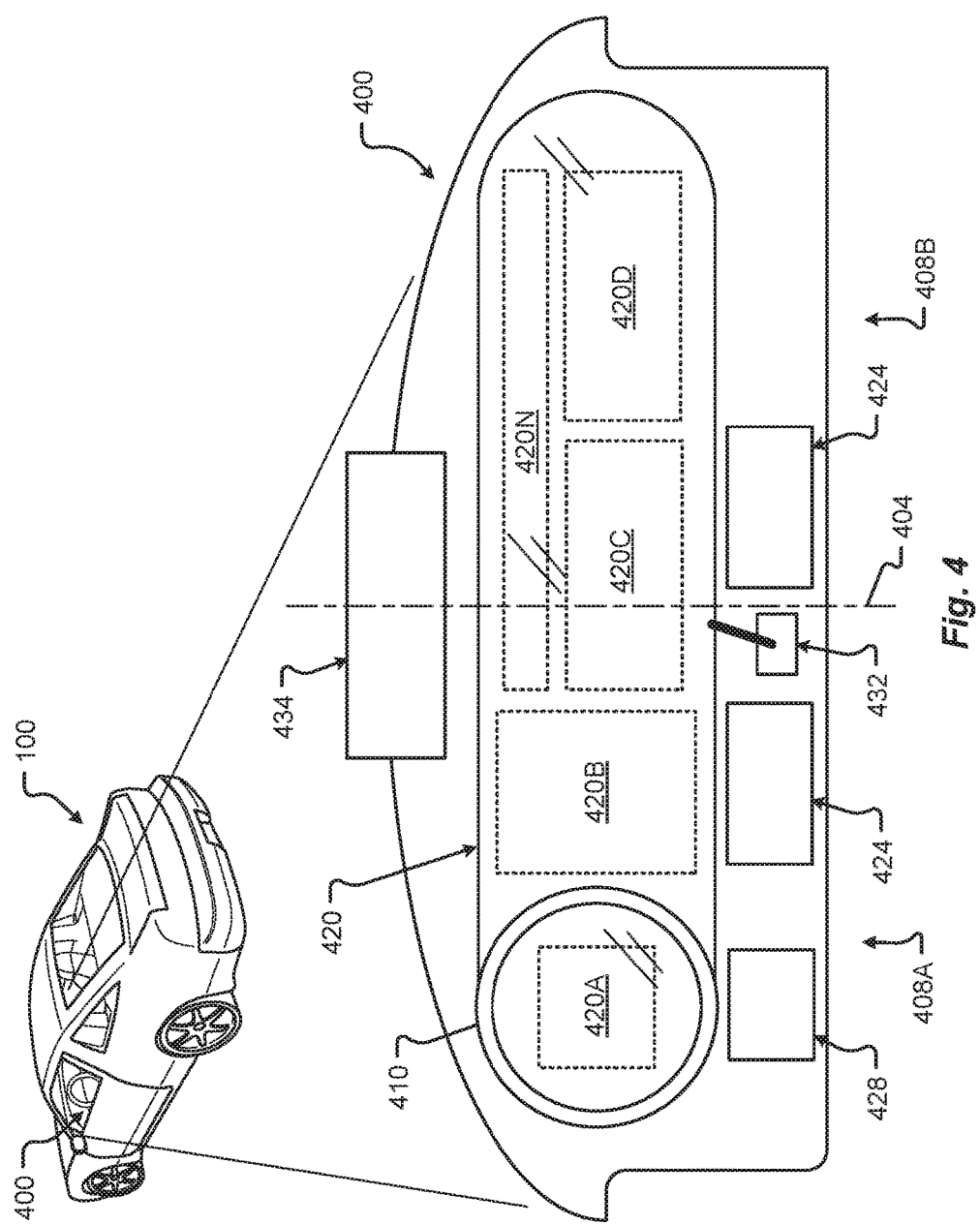
FIG. 4 shows an embodiment of the instrument panel of the vehicle according to one embodiment of the present disclosure.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

Figure 5:
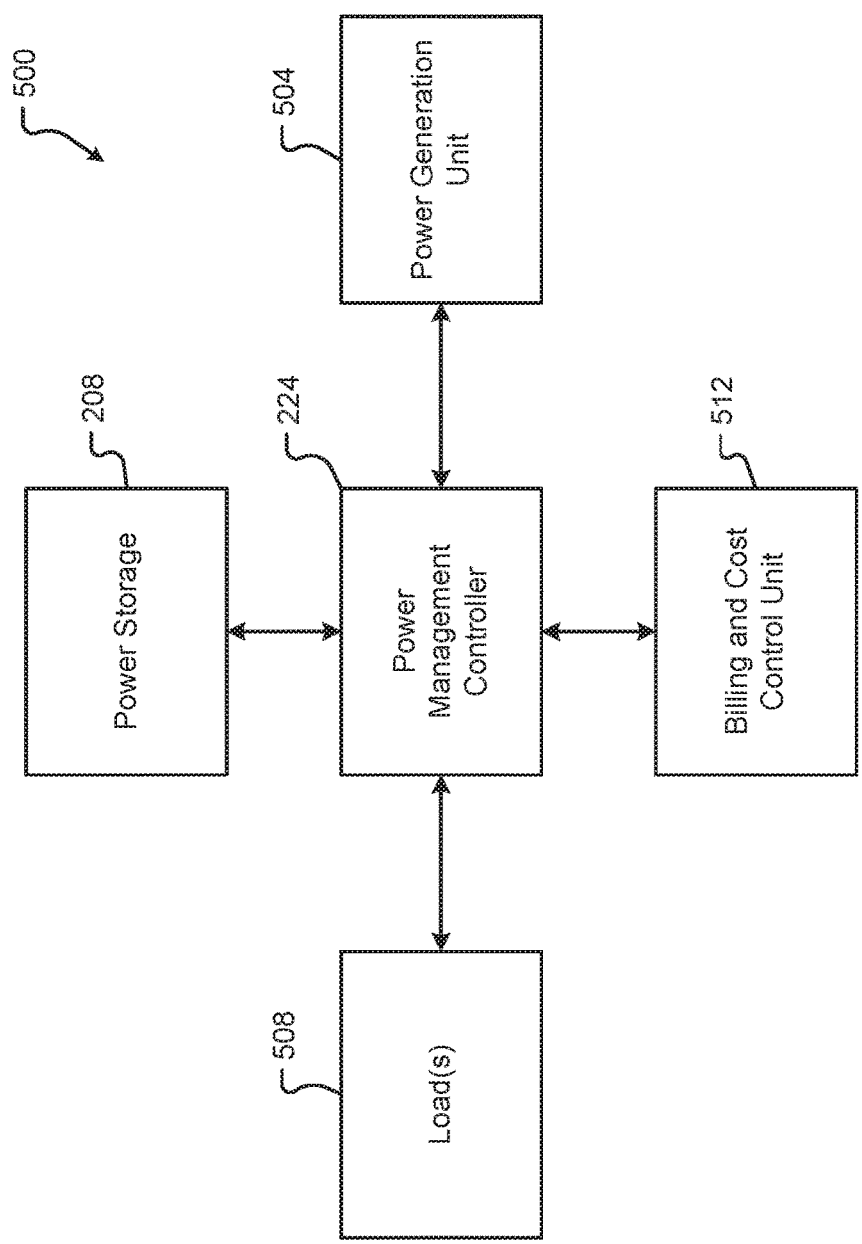
FIG. 5 is a block diagram of an embodiment of an electrical system of the vehicle.

An embodiment of the electrical system 500 associated with the vehicle 100 may be as shown in FIG. 5. The electrical system 500 can include power source(s) that generate power, power storage that stores power, and/or load(s) that consume power. Power sources may be associated with a power generation unit 504. Power storage may be associated with a power storage system 208. Loads may be associated with loads 508. The electrical system 500 may be managed by a power management controller 224. Further, the electrical system 500 can include one or more other interfaces or controllers, which can include the billing and cost control unit 512.

Figure 6:
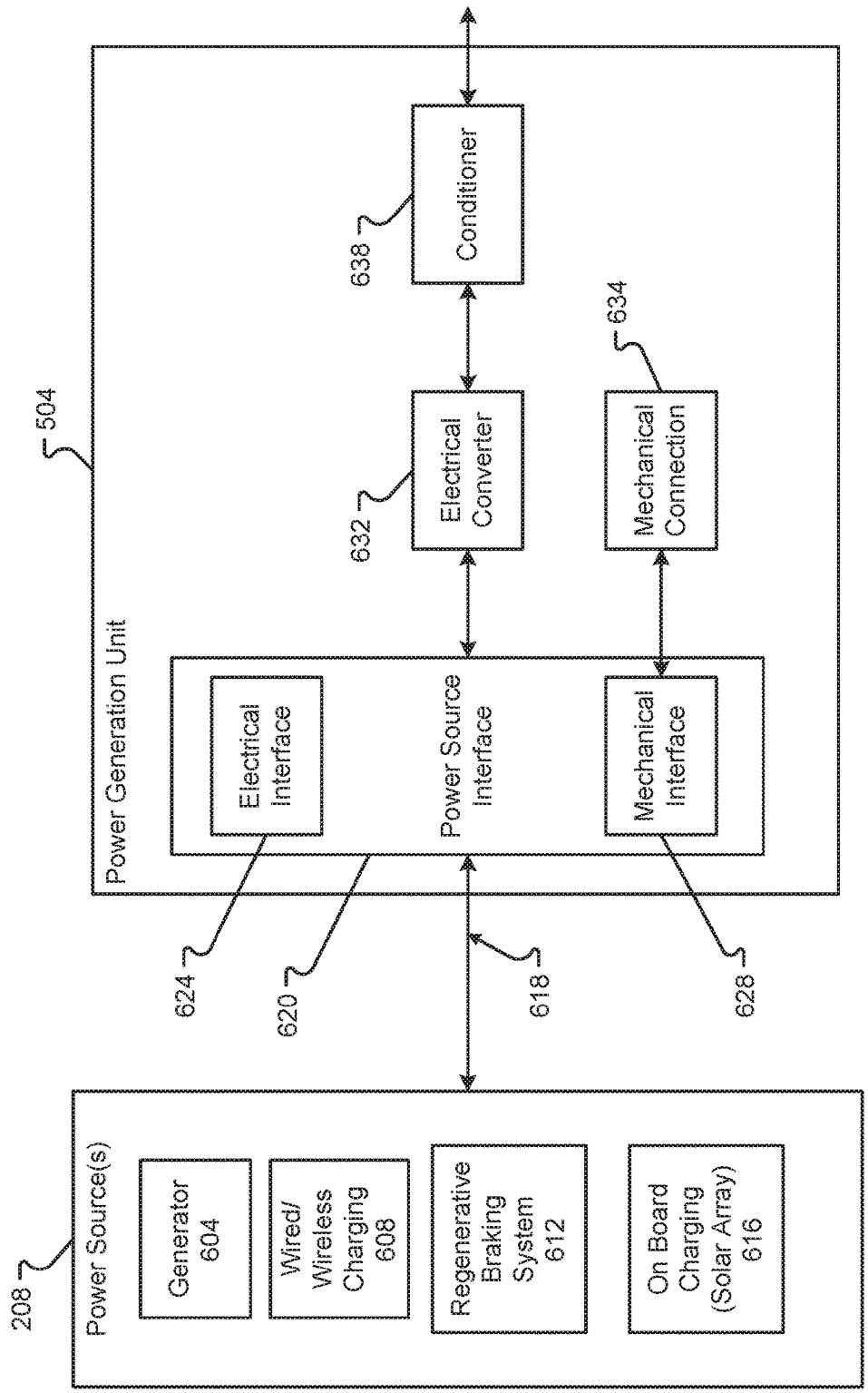
FIG. 6 is a block diagram of an embodiment of a power generation unit associated with the electrical system of the vehicle.
Figure 7:
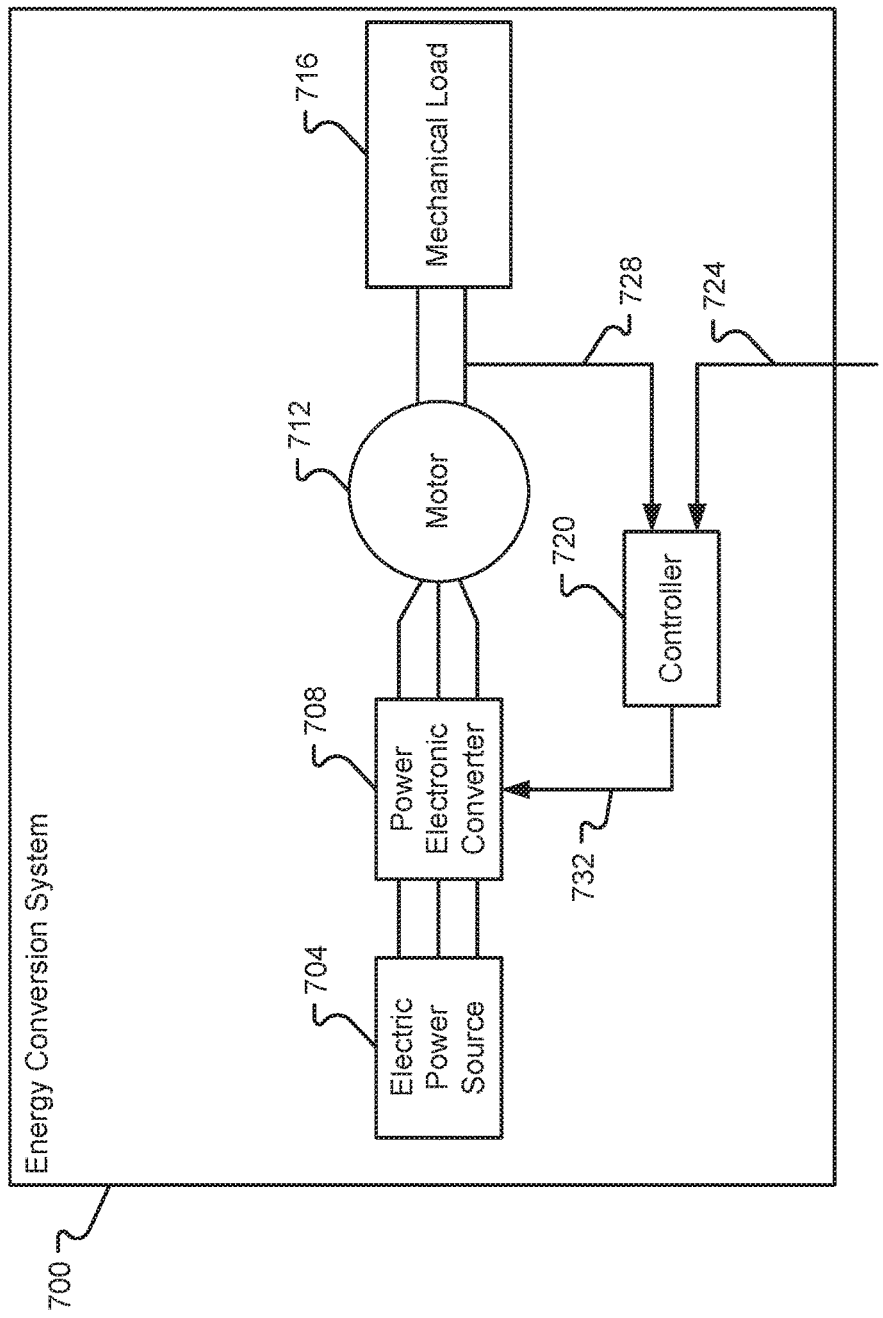
FIG. 7 is a block diagram depicting details of an energy conversion system.

The power generation unit 504 may be as described in conjunction with FIG. 6. The power storage component 208 may be as described in conjunction with FIG. 7. The loads 508 may be as described in conjunction with FIG. 8.

The billing and cost control unit 512 may interface with the power management controller 224 to determine the amount of charge or power provided to the power storage 208 through the power generation unit 504. The billing and cost control unit 512 can then provide information for billing the vehicle owner. Thus, the billing and cost control unit 512 can receive and/or send power information to third party system(s) regarding the received charge from an external source. The information provided can help determine an amount of money required, from the owner of the vehicle, as payment for the provided power. Alternatively, or in addition, if the owner of the vehicle provided power to another vehicle (or another device/system), that owner may be owed compensation for the provided power or energy, e.g., a credit.

The power management controller 224 can be a computer or computing system(s) and/or electrical system with associated components, as described herein, capable of managing the power generation unit 504 to receive power, routing the power to the power storage 208, and then providing the power from either the power generation unit 504 and/or the power storage 208 to the loads 508. Thus, the power management controller 224 may execute programming that controls switches, devices, components, etc. involved in the reception, storage, and provision of the power in the electrical system 500.

An embodiment of the power generation unit 504 may be as shown in FIG. 6. Generally, the power generation unit 504 may be electrically coupled to one or more power sources 208. The power sources 208 can include power sources internal and/or associated with the vehicle 100 and/or power sources external to the vehicle 100 to which the vehicle 100 electrically connects. One of the internal power sources can include an on board generator 604. The generator 604 may be an alternating current (AC) generator, a direct current (DC) generator or a self-excited generator. The AC generators can include induction generators, linear electric generators, and/or other types of generators. The DC generators can include homopolar generators and/or other types of generators. The generator 604 can be brushless or include brush contacts and generate the electric field with permanent magnets or through induction. The generator 604 may be mechanically coupled to a source of kinetic energy, such as an axle or some other power take-off. The generator 604 may also have another mechanical coupling to an exterior source of kinetic energy, for example, a wind turbine.

Another power source 208 may include wired or wireless charging 608. The wireless charging system 608 may include inductive and/or resonant frequency inductive charging systems that can include coils, frequency generators, controllers, etc. Wired charging may be any kind of grid-connected charging that has a physical connection, although, the wireless charging may be grid connected through a wireless interface. The wired charging system can include connectors, wired interconnections, the controllers, etc. The wired and wireless charging systems 608 can provide power to the power generation unit 504 from external power sources 208.

Internal sources for power may include a regenerative braking system 612. The regenerative braking system 612 can convert the kinetic energy of the moving car into electrical energy through a generation system mounted within the wheels, axle, and/or braking system of the vehicle 100. The regenerative braking system 612 can include any coils, magnets, electrical interconnections, converters, controllers, etc. required to convert the kinetic energy into electrical energy.

Another source of power 208, internal to or associated with the vehicle 100, may be a solar array 616. The solar array 616 may include any system or device of one or more solar cells mounted on the exterior of the vehicle 100 or integrated within the body panels of the vehicle 100 that provides or converts solar energy into electrical energy to provide to the power generation unit 504.

The power sources 208 may be connected to the power generation unit 504 through an electrical interconnection 618. The electrical interconnection 618 can include any wire, interface, bus, etc. between the one or more power sources 208 and the power generation unit 504.

The power generation unit 504 can also include a power source interface 620. The power source interface 620 can be any type of physical and/or electrical interface used to receive the electrical energy from the one or more power sources 208; thus, the power source interface 620 can include an electrical interface 624 that receives the electrical energy and a mechanical interface 628 which may include wires, connectors, or other types of devices or physical connections. The mechanical interface 628 can also include a physical/mechanical connection 634 to the power generation unit 504.

The electrical energy from the power source 208 can be processed through the power source interface 620 to an electric converter 632. The electric converter 632 may convert the characteristics of the power from one of the power sources into a useable form that may be used either by the power storage 208 or one or more loads 508 within the vehicle 100. The electrical converter 632 may include any electronics or electrical devices and/or component that can change electrical characteristics, e.g., AC frequency, amplitude, phase, etc. associated with the electrical energy provided by the power source 208. The converted electrical energy may then be provided to an optional conditioner 638. The conditioner 638 may include any electronics or electrical devices and/or component that may further condition the converted electrical energy by removing harmonics, noise, etc. from the electrical energy to provide a more stable and effective form of power to the vehicle 100.

Additional details of an energy conversion system 700 that may be used as part of the power generation unit 504 will be described in accordance with at least some embodiments of the present disclosure. The system 700 may include an electric power source 704, a power converter 708, a motor 712, a mechanical load 716, and a controller 720. The power source 704 may be similar or identical to one or more of the power sources 208. The power converter 708 may be similar or identical to converter 632. The motor 712 may be similar or identical to any one of the motors described herein (e.g., motor 212). The mechanical load 716 may be similar or identical to load 508 or any of the specific loads described with relation thereto in connection with FIG. 8.

The controller 720 may be positioned in a control feedback loop in which the controller 720 receives inputs 724, 728 from both the motor 712 output 728 and from external sources 724. The external control signals 724 may cause the controller 720 to control the motor 712 in such a way that one or more signals are transmitted via the motor 712 as will be described in further detail herein. The motor feedback signal 728, on the other hand, may be provided to the controller 720 as a voltage signal, current signal, or the like. The motor feedback signal 728 may provide the controller 720 with current state and operational information for the motor 712. Based on the inputs 724, 728, the controller 720 may determine how to further control the motor 712 with a motor control signal 732. The motor control signal 732 may be provided to the power electronic converter 708, which adjusts the amount of power/voltage/current provided to the motor 712 in response to the motor control signal 732. In some embodiments, the power converter 708 is configured to provide three-phase power to the motor 712, thereby enabling operation of the motor 712. In some embodiments, the motor 712 may be configured to be operated by single-phase power inputs or something other than a three-phase power input.

Alternatively or additionally, the controller 720 can be used as a mechanism for motor control during driving of the vehicle 100. The controller 720 may be configured as a Field Programmable Gate Array (FPGA), an Application Specific Integrated Circuit (ASIC), or some other collection of hardware components. Alternatively or additionally, the controller 720 may comprise a microprocessor and internal memory that stores software instructions that are executable by the microprocessor. In some embodiments, the controller 720 may be responsive to external control signals 724 that are provided by the vehicle user interface or more specifically the input device 432 of the control panel 400. For example, a user may indicate that one or more messages are to be transmitted via the motor 712 and those messages may be communicated to controller 720 via the external control signal 724. Upon receiving the external control signal 724 and determining the current state of the motor 712 based on the motor feedback signal 728, the controller 720 may determine an appropriate motor control signal 732 to provide to the power converter 732.

It should be appreciated that the energy conversion system 700 may be implemented for a single motor in the vehicle 100 (especially if the vehicle only comprises a single motor). Alternatively, if the vehicle 100 has multiple motors, one, some, or all of those multiple motors may be outfitted with and controlled by a controller 720. Further still, although the motor control signal 732 is shown as being provided to the power converter 708, it should be appreciated that the control signal could be provided to an intermediate device between the power source 704 and power converter 708 or to some other device that is electrically coupled with the motor 712.

Figure 8:
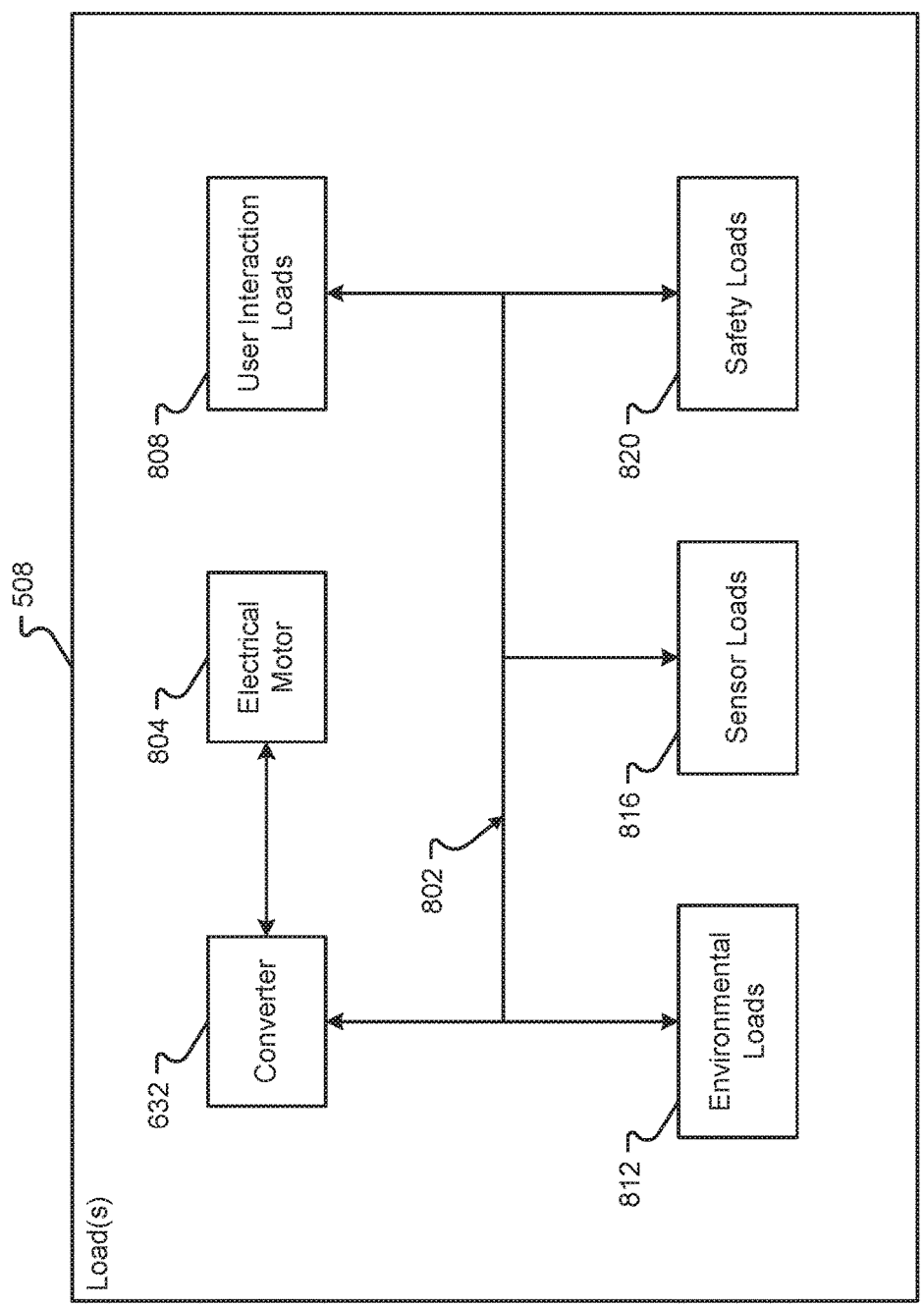
FIG. 8 is a block diagram of an embodiment of loads associated with the electrical system of the vehicle.

An embodiment of one or more loads 508 associated with the vehicle 100 may be as shown in FIG. 8. The loads 508 may include a bus or electrical interconnection system 802, which provides electrical energy to one or more different loads within the vehicle 100. The bus 802 can be any number of wires or interfaces used to connect the power generation unit 504 and/or power storage 208 to the one or more loads 508. The converter 632 may be an interface from the power generation unit 504 or the power storage 208 into the loads 508. The converter 632 may be the same or similar to electric converter 632 as shown in FIG. 6.

The electric motor 804 can be any type of DC or AC electric motor. The electric motor may be a direct drive or induction motor using permanent magnets and/or winding either on the stator and/or rotor. The electric motor 804 may also be wireless or include brush contacts. The electric motor 804 may be capable of providing a torque and enough kinetic energy to move the vehicle 100 in traffic. In some embodiments, the electric motor 804 may be similar, if not identical, to the electric motor 212 described in conjunction with FIG. 2 and/or the motor 712 described in conjunction with FIG. 7. As will be discussed in further detail herein, the motor 804 (and other examples of motors described herein), can be utilized to transmit one or more messages. In other words, the motor 804 may be dual-purposed to help provide physical motion to the vehicle 100 as well as provide communication capabilities.

The different loads 508 may also include environmental loads 812, sensor loads 816, safety loads 820, user interaction loads 808, etc. User interaction loads 808 can be any energy used by user interfaces or systems that interact with the driver and/or passenger(s) of the vehicle 100. These loads 808 may include, for example, the heads up display 434, the dash display 420, 424, 428, the radio, user interfaces on the head unit, lights, radio, and/or other types of loads that provide or receive information from the occupants of the vehicle 100. The environmental loads 812 can be any loads used to control the environment within the vehicle 100. For example, the air conditioning or heating unit of the vehicle 100 can be environmental loads 812. Other environmental loads can include lights, fans, and/or defrosting units, etc. that may control the environment within, and/or outside of, the vehicle 100. The sensor loads 816 can be any loads used by sensors, for example, air bag sensors, GPS, and other such sensors used to either manage or control the vehicle 100 and/or provide information or feedback to the vehicle occupants. The safety loads 820 can include any safety equipment, for example, seat belt alarms, airbags, headlights, blinkers, etc. that may be used to manage the safety of the occupants of the vehicle 100. There may be more or fewer loads than those described herein, although they may not be shown in FIG. 8.

Figure 9:
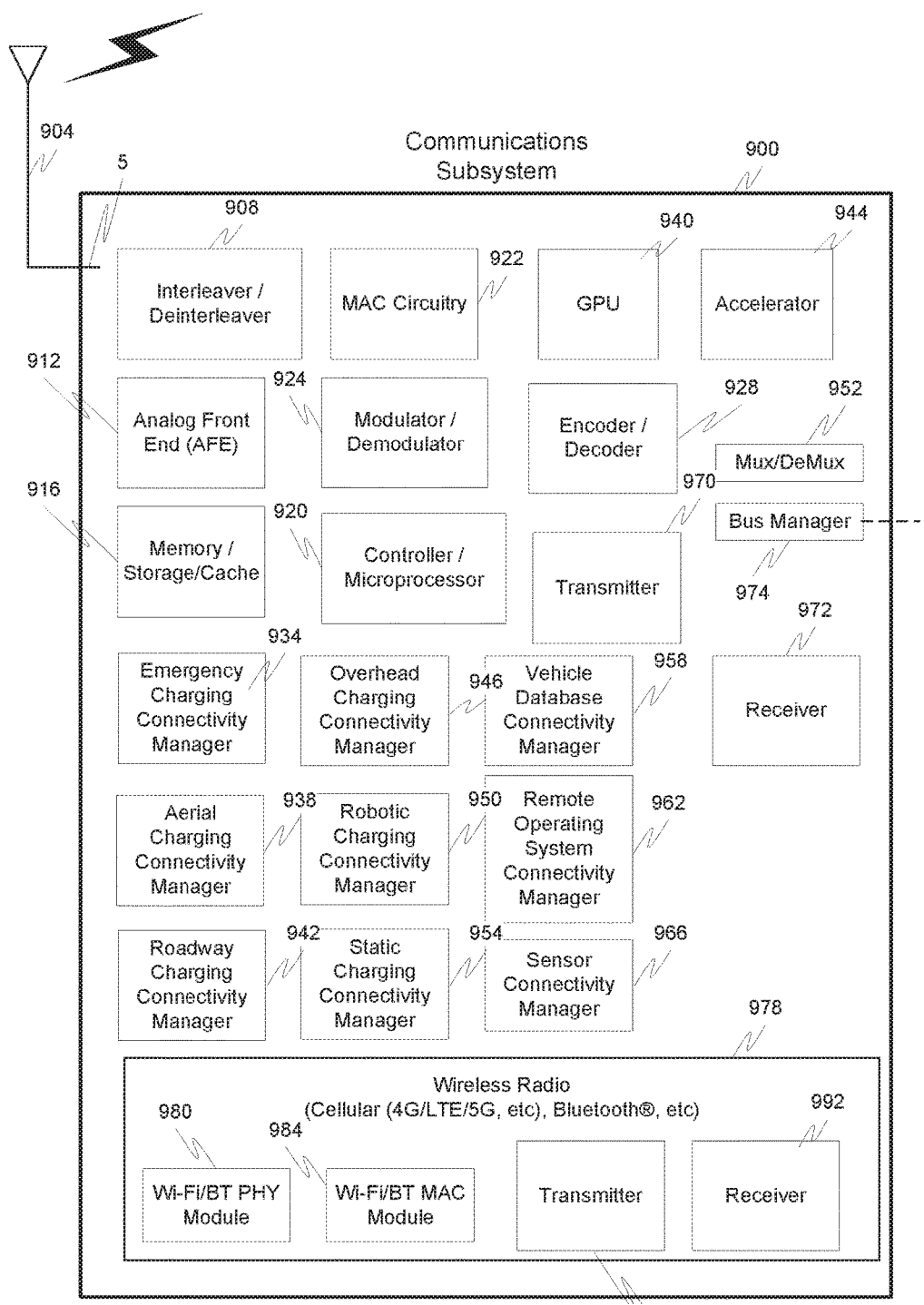
FIG. 9 is a block diagram of an embodiment of a communications subsystem of the vehicle.

FIG. 9 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem can include one or more communications links (that can be wired or wireless) and/or communications busses (managed by the bus manager 974), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem enables communications between any if the inter-vehicle systems and subsystems as well as communications with non-collocated resources, such as those reachable over a network such as the Internet.

The communications subsystem 900, in addition to well-known componentry (which has been omitted for clarity), includes interconnected elements including one or more of: one or more antennas 904, an interleaver/deinterleaver 908, an analog front end (AFE) 912, memory/storage/cache 916, controller/microprocessor 920, MAC circuitry 922, modulator/demodulator 924, encoder/decoder 928, a plurality of connectivity managers 934-966, GPU 940, accelerator 944, a multiplexer/demultiplexer 952, transmitter 970, receiver 972 and wireless radio 978 components such as a Wi-Fi PHY/Bluetooth® module 980, a Wi-Fi/BT MAC module 984, transmitter 988 and receiver 992. The various elements in the device 900 are connected by one or more links/busses 5 (not shown, again for sake of clarity).

The device 400 can have one more antennas 904, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 904 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

In some embodiments, windings of a motor 212, 712, 804 may be leveraged as an antenna 904. More specifically, the coil windings of either a stator or rotor in the motor may be utilized as an antenna 904 to transmit one or more messages. In other embodiments, the rotational speed of motor itself may be physically controlled to adjust a frequency of electromagnetic radiation emitted by the motor. These adjustments in the frequency of the electromagnetic radiation can be used to convey one or more bits, bytes, symbols, or chunks of information. In other embodiments, the various motor frequencies can be mapped to predetermined characters, numbers, messages, etc. such that detection of a particular motor frequency can be converted to the predetermined character, number, message, etc. when the frequency is detected.

Antenna(s) 904 generally interact with the Analog Front End (AFE) 912, which is needed to enable the correct processing of the received modulated signal and signal conditioning for a transmitted signal. The AFE 912 can be functionally located between the antenna and a digital baseband system in order to convert the analog signal into a digital signal for processing and vice-versa.

The subsystem 900 can also include a controller/microprocessor 920 and a memory/storage/cache 916. The subsystem 900 can interact with the memory/storage/cache 916 which may store information and operations necessary for configuring and transmitting or receiving the information described herein. The memory/storage/cache 916 may also be used in connection with the execution of application programming or instructions by the controller/microprocessor 920, and for temporary or long term storage of program instructions and/or data. As examples, the memory/storage/cache 920 may comprise a computer-readable device, RAM, ROM, DRAM, SDRAM, and/or other storage device(s) and media.

The controller/microprocessor 920 may comprise a general purpose programmable processor or controller for executing application programming or instructions related to the subsystem 900. Furthermore, the controller/microprocessor 920 can perform operations for configuring and transmitting/receiving information as described herein. The controller/microprocessor 920 may include multiple processor cores, and/or implement multiple virtual processors. Optionally, the controller/microprocessor 920 may include multiple physical processors. By way of example, the controller/microprocessor 920 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 900 can further include a transmitter 970 and receiver 972 which can transmit and receive signals, respectively, to and from other devices, subsystems and/or other destinations using the one or more antennas 904 and/or links/busses. Included in the subsystem 900 circuitry is the medium access control or MAC Circuitry 922. MAC circuitry 922 provides for controlling access to the wireless medium. In an exemplary embodiment, the MAC circuitry 922 may be arranged to contend for the wireless medium and configure frames or packets for communicating over the wired/wireless medium.

The subsystem 900 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 900 also includes a GPU 940, an accelerator 944, a Wi-Fi/BT/BLE PHY module 980 and a Wi-Fi/BT/BLE MAC module 984 and wireless transmitter 988 and receiver 992. In some embodiments, the GPU 940 may be a graphics processing unit, or visual processing unit, comprising at least one circuit and/or chip that manipulates and changes memory to accelerate the creation of images in a frame buffer for output to at least one display device. The GPU 940 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 934-966 (even) manage and/or coordinate communications between the subsystem 900 and one or more of the systems disclosed herein and one or more other devices/systems. The connectivity managers include an emergency charging connectivity manager 934, an aerial charging connectivity manager 938, a roadway charging connectivity manager 942, an overhead charging connectivity manager 946, a robotic charging connectivity manager 950, a static charging connectivity manager 954, a vehicle database connectivity manager 958, a remote operating system connectivity manager 962 and a sensor connectivity manager 966.

The emergency charging connectivity manager 934 can coordinate not only the physical connectivity between the vehicle 100 and the emergency charging device/vehicle, but can also communicate with one or more of the power management controller, one or more third parties and optionally a billing system(s). As an example, the vehicle 100 can establish communications with the emergency charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the emergency charging connectivity manager 934 can also communicate information, such as billing information to the emergency charging vehicle and/or a third party. This billing information could be, for example, the owner of the vehicle, the driver/occupant(s) of the vehicle, company information, or in general any information usable to charge the appropriate entity for the power received.

The aerial charging connectivity manager 938 can coordinate not only the physical connectivity between the vehicle 100 and the aerial charging device/vehicle, but can also communicate with one or more of the power management controller, one or more third parties and optionally a billing system(s). As an example, the vehicle 100 can establish communications with the aerial charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the aerial charging connectivity manager 938 can similarly communicate information, such as billing information to the aerial charging vehicle and/or a third party. This billing information could be, for example, the owner of the vehicle 100, the driver/occupant(s) of the vehicle 100, company information, or in general any information usable to charge the appropriate entity for the power received etc., as discussed.

The roadway charging connectivity manager 942 and overhead charging connectivity manager 946 can coordinate not only the physical connectivity between the vehicle 100 and the charging device/system, but can also communicate with one or more of the power management controller, one or more third parties and optionally a billing system(s). As one example, the vehicle 100 can request a charge from the charging system when, for example, the vehicle 100 needs or is predicted to need power. As an example, the vehicle 100 can establish communications with the charging device/vehicle to one or more of coordinate interconnectivity between the two for charging and share information for billing. Once charging is complete, the amount of charge provided can be tracked and optionally forwarded to, for example, a third party for billing. This billing information could be, for example, the owner of the vehicle 100, the driver/occupant(s) of the vehicle 100, company information, or in general any information usable to charge the appropriate entity for the power received etc., as discussed. The person responsible for paying for the charge could also receive a copy of the billing information as is customary. The robotic charging connectivity manager 950 and static charging connectivity manager 954 can operate in a similar manner to that described herein.

The vehicle database connectivity manager 958 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 962 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 966 facilitates communications between any one or more of the vehicle sensors and any one or more of the other vehicle systems. The sensor connectivity manager 966 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (internet protocol) address(es), associated with the vehicle and one or other system or subsystems or components therein. These identifiers can be used in conjunction with any one or more of the connectivity managers as discussed herein.

Figure 10:
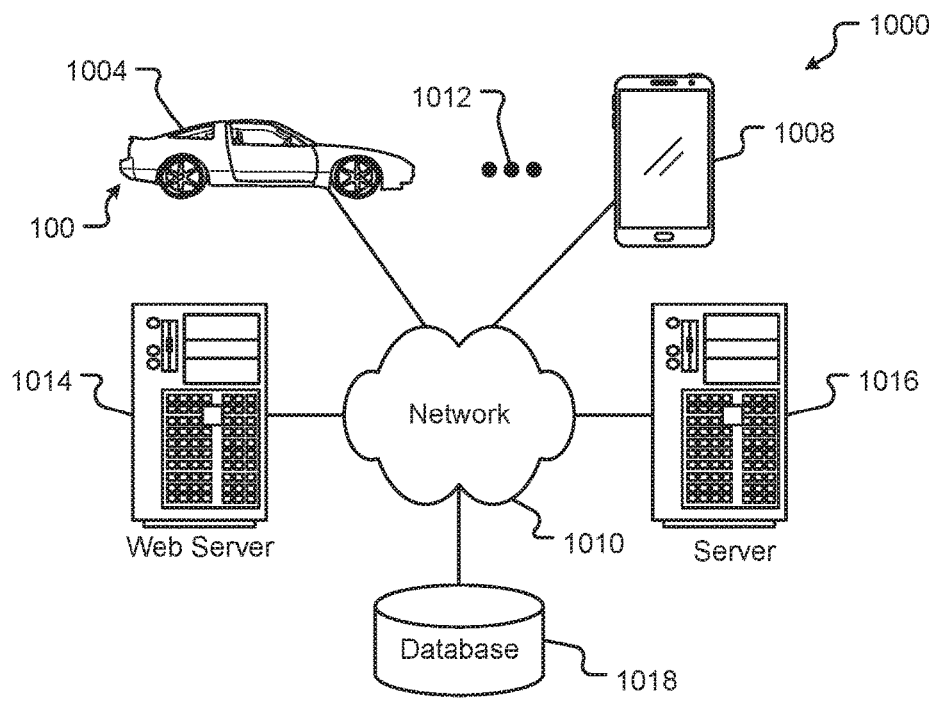
FIG. 10 is a block diagram of a computing environment associated with the embodiments presented herein.

FIG. 10 illustrates a block diagram of a computing environment 1000 that may function as the servers, user computers, or other systems provided and described herein. The environment 1000 includes one or more user computers, or computing devices, such as a vehicle computing device 1004, a communication device 1008, and/or more 1012. The computing devices 1004, 1008, 1012 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 1004, 1008, 1012 may also have any of a variety of applications, including for example, database client and/or server applications, and web browser applications. Alternatively, the computing devices 1004, 1008, 1012 may be any other electronic device, such as a thin-client computer, Internet-enabled mobile telephone, and/or personal digital assistant, capable of communicating via a network 1010 and/or displaying and navigating web pages or other types of electronic documents. Although the exemplary computer environment 1000 is shown with two computing devices, any number of user computers or computing devices may be supported.

Environment 1000 further includes a network 1010. The network 1010 may can be any type of network familiar to those skilled in the art that can support data communications using any of a variety of commercially-available protocols, including without limitation SIP, TCP/IP, SNA, IPX, AppleTalk, and the like. Merely by way of example, the network 1010 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 1014, 1016. In this example, server 1014 is shown as a web server and server 1016 is shown as an application server. The web server 1014, which may be used to process requests for web pages or other electronic documents from computing devices 1004, 1008, 1012. The web server 1014 can be running an operating system including any of those discussed above, as well as any commercially-available server operating systems. The web server 1014 can also run a variety of server applications, including SIP (Session Initiation Protocol) servers, HTTP(s) servers, FTP servers, CGI servers, database servers, Java servers, and the like. In some instances, the web server 1014 may publish operations available operations as one or more web services.

The environment 1000 may also include one or more file and or/application servers 1016, which can, in addition to an operating system, include one or more applications accessible by a client running on one or more of the computing devices 1004, 1008, 1012. The server(s) 1016 and/or 1014 may be one or more general purpose computers capable of executing programs or scripts in response to the computing devices 1004, 1008, 1012. As one example, the server 1016, 1014 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 1016 may also include database servers, including without limitation those commercially available from Oracle®, Microsoft®, Sybase®, IBM® and the like, which can process requests from database clients running on a computing device 1004, 1008, 1012.

The web pages created by the server 1014 and/or 1016 may be forwarded to a computing device 1004, 1008, 1012 via a web (file) server 1014, 1016. Similarly, the web server 1014 may be able to receive web page requests, web services invocations, and/or input data from a computing device 1004, 1008, 1012 (e.g., a user computer, etc.) and can forward the web page requests and/or input data to the web (application) server 1016. In further embodiments, the server 1016 may function as a file server. Although for ease of description, FIG. 10 illustrates a separate web server 1014 and file/application server 1016, those skilled in the art will recognize that the functions described with respect to servers 1014, 1016 may be performed by a single server and/or a plurality of specialized servers, depending on implementation-specific needs and parameters. The computer systems 1004, 1008, 1012, web (file) server 1014 and/or web (application) server 1016 may function as the system, devices, or components described in FIGS. 1-10.

The environment 1000 may also include a database 1018. The database 1018 may reside in a variety of locations. By way of example, database 1018 may reside on a storage medium local to (and/or resident in) one or more of the computers 1004, 1008, 1012, 1014, 1016. Alternatively, it may be remote from any or all of the computers 1004, 1008, 1012, 1014, 1016, and in communication (e.g., via the network 1010) with one or more of these. The database 1018 may reside in a storage-area network ("SAN") familiar to those skilled in the art. Similarly, any necessary files for performing the functions attributed to the computers 1004, 1008, 1012, 1014, 1016 may be stored locally on the respective computer and/or remotely, as appropriate. The database 1018 may be a relational database, such as Oracle 20i®, that is adapted to store, update, and retrieve data in response to SQL-formatted commands.

Figure 11:
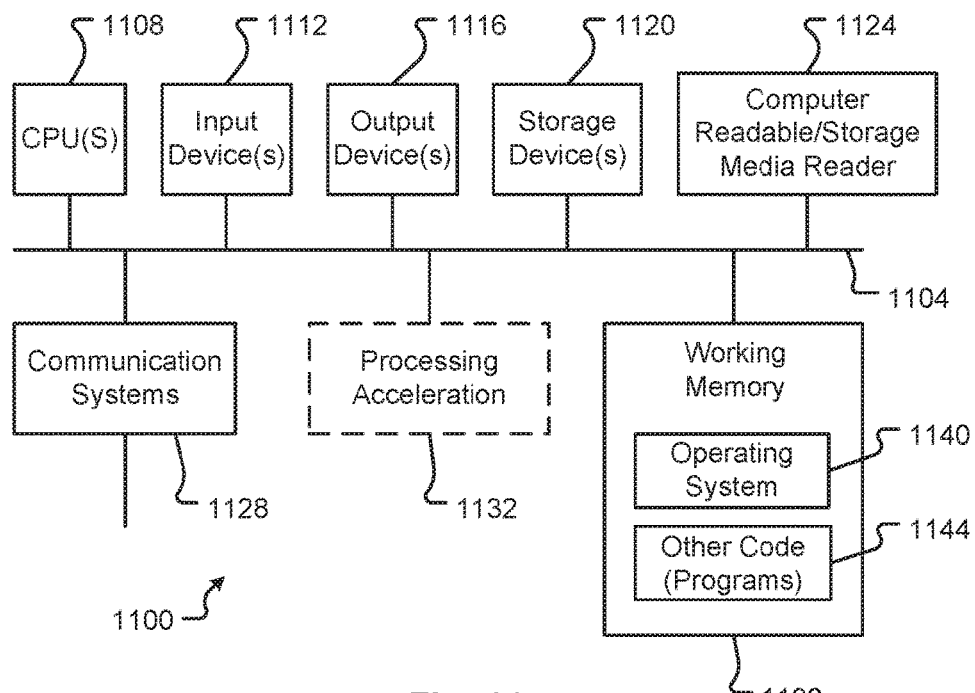
FIG. 11 is a block diagram of a computing device associated with one or more components described herein.

FIG. 11 illustrates one embodiment of a computer system 1100 upon which the servers, user computers, computing devices, or other systems or components described above may be deployed or executed. The computer system 1100 is shown comprising hardware elements that may be electrically coupled via a bus 1104. The hardware elements may include one or more central processing units (CPUs) 1108; one or more input devices 1112 (e.g., a mouse, a keyboard, etc.); and one or more output devices 1116 (e.g., a display device, a printer, etc.). The computer system 1100 may also include one or more storage devices 1120. By way of example, storage device(s) 1120 may be disk drives, optical storage devices, solid-state storage devices such as a random access memory ("RAM") and/or a read-only memory ("ROM"), which can be programmable, flash-updateable and/or the like.

The computer system 1100 may additionally include a computer-readable storage media reader 1124; a communications system 1128 (e.g., a modem, a network card (wireless or wired), an infra-red communication device, etc.); and working memory 1136, which may include RAM and ROM devices as described above. The computer system 1100 may also include a processing acceleration unit 1132, which can include a DSP, a special-purpose processor, and/or the like.

The computer-readable storage media reader 1124 can further be connected to a computer-readable storage medium, together (and, optionally, in combination with storage device(s) 1120) comprehensively representing remote, local, fixed, and/or removable storage devices plus storage media for temporarily and/or more permanently containing computer-readable information. The communications system 1128 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 1100 may also comprise software elements, shown as being currently located within a working memory 1136, including an operating system 1140 and/or other code 1144. It should be appreciated that alternate embodiments of a computer system 1100 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 1108 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 12:
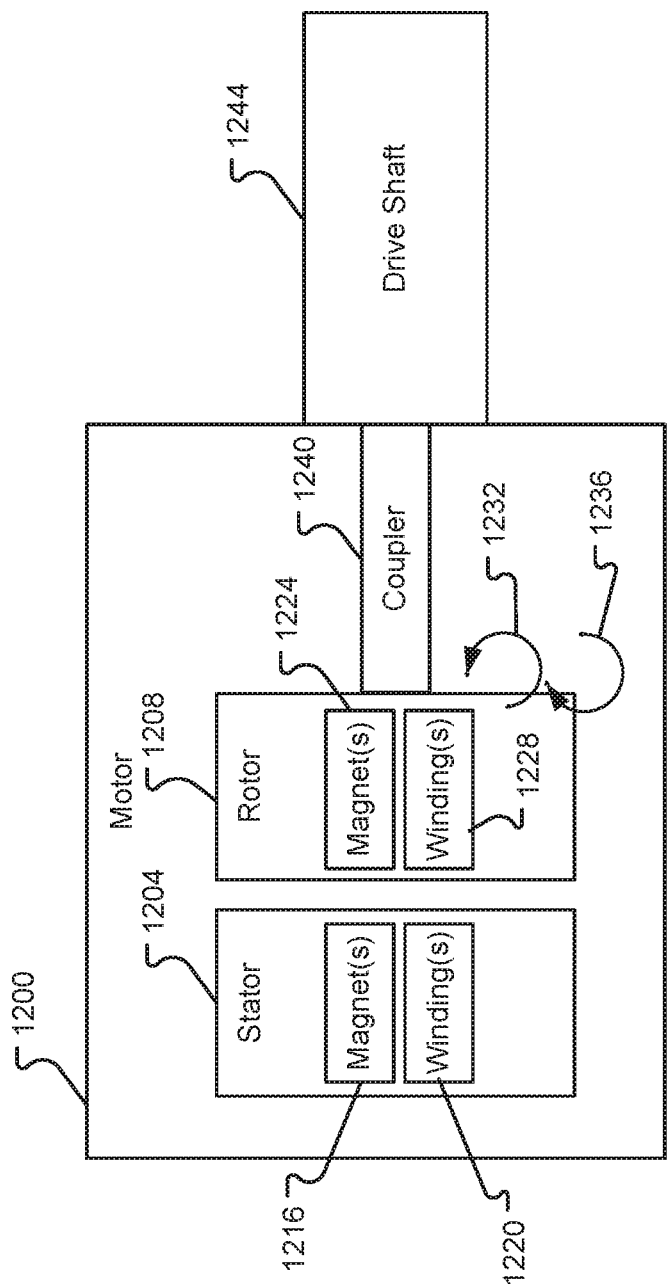
FIG. 12 is a block diagram of an illustrative motor in accordance with at least some embodiments of the present disclosure.

Referring to FIG. 12, additional details of an illustrative motor 1200 will be described in accordance with at least some embodiments of the present disclosure. The motor 1200 may correspond to the motor 712 shown in FIG. 7, motor 212 shown in FIG. 2, or some other motor depicted and described herein. Furthermore, although certain embodiments of the present disclosure have depicted the vehicle 100 as having multiple motors, it should be appreciated that the vehicle 100 may comprise only a single motor and such a single motor could correspond to motor 1200 (or some other example of a motor described herein). In other words, embodiments of the present disclosure contemplate vehicles with both a single motor and a vehicle with multiple motors. A vehicle 100 with multiple motors does not necessarily need to have each motor be of the same type. Rather, a multi-motor vehicle may have motors of different types and the different motors may be controller in a coordinated fashion (e.g., via a central controller) or in a distributed fashion (e.g., with independent controllers) without departing from the scope of the present disclosure.

The illustrative motor 1200 may correspond to a three-phase motor having a stator 1204 and rotor 1208. The rotor 1208 may correspond to a movable part of the motor 1200 whereas the stator 1204 may correspond to a stationary part of the motor 1200. In some embodiments, the rotor 1208 may be coupled to a drive shaft 1244 or the like via a coupler 1240. The coupler 1240 may correspond to one or multiple mechanical interconnects that translate motion of the rotor 1208 into motion of the drive shaft 1244. As an illustrative, but non-limiting example, the coupler 1240 may translate rotational motion of the rotor 1208 in either a first direction 1232 or a second direction 1236 into rotational motion of the drive shaft 1244. The drive shaft 1244 does not necessarily need to be implemented as a traditional drive shaft 1244, but rather may correspond to any movable part of the vehicle 100 that can translate energy of the motor 1200 into rotational energy for a wheel 220.

In some embodiments, the stator 1204 and rotor 1208 may both be provided with one or more magnets 1216, 1224 and one or more windings 1220, 1228. The stator 1204 windings 1220 may be wrapped around the stator 1204 magnets 1216 with N turns. The stator 1204 windings 1220 may receive electrical current from the power converter 708. As current flows through the stator 1204 windings 1220, the electrical current may begin to produce an electromagnetic. A rotating magnetic field produced in the stator 1204 induces electromagnetic flux in the rotor 1208. In turn, current in windings 1228 of the rotor 1208 flows in the reverse direction of the rotating magnetic field, causing rotor 1208 motion in either the first 1232 or second direction 1236. As mentioned above, motion of the rotor 1208 may be translated to motion of the drive shaft 1244 via a coupler 1240. As will be discussed in further detail herein, it may be possible to dynamically (e.g., during operation of the vehicle 100) decouple the rotor 1208 from the drive shaft 1244 for one or more of the motors 1200 in the vehicle 100. Upon achieving such a decoupling, the motor(s) 1200 may be controlled to transmit one or more electromagnetic signals via the stator windings 1220—which can be effectively operated as an antenna due to their physical orientation of being wrapped around the magnets 1216. Alternatively or additionally, the motor 1200 can be controlled in such a way that the rotational speed of the rotor 1208 is modified, thereby causing the motor 1200 to emit an electromagnetic signal of a predetermined frequency when the rotor 1208 is decoupled from the drive shaft 1244. In other words, the rotor 1208 can be rotated at different speeds, thereby causing the motor 1200 to transmit an electromagnetic signal of different frequencies. The amount of current provided to the stator windings 1220 can effectively control the speed of rotation of the rotor 1208, thereby controlling the frequency of the signal output by the motor 1200. Additional details of such a message transmission capability will be described in further detail herein.

Figure 13:
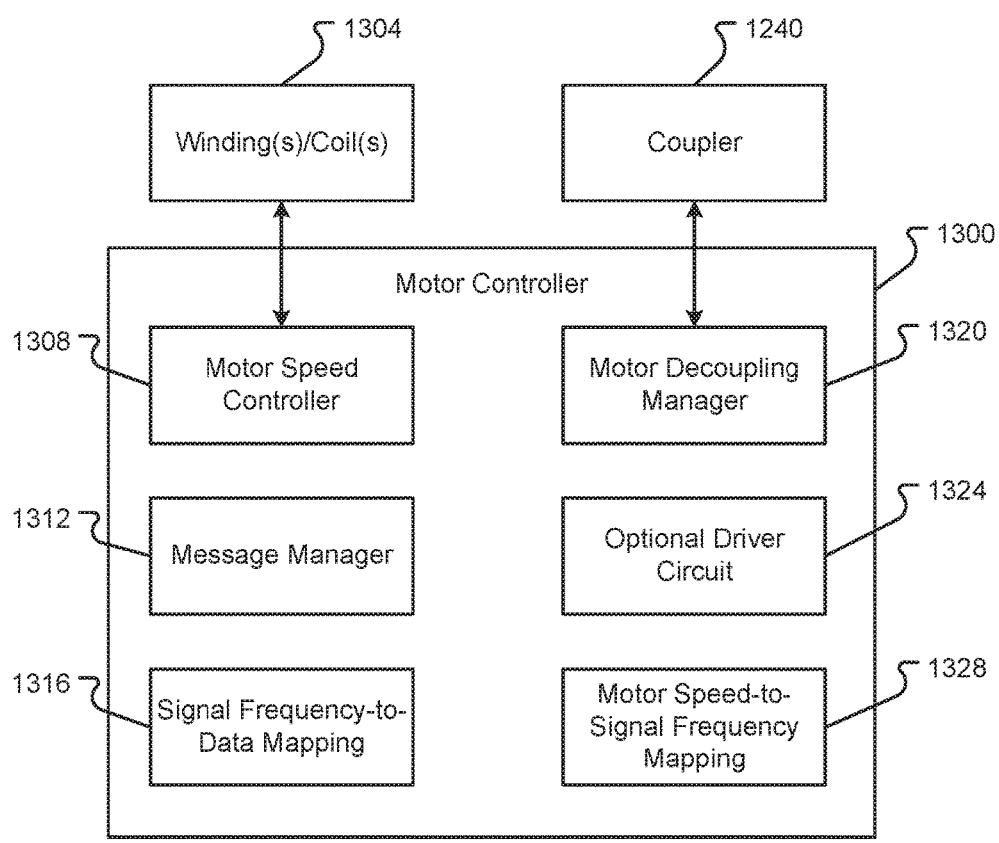
FIG. 13 is a block diagram of an illustrative motor controller in accordance with at least some embodiments of the present disclosure.

With reference now to FIG. 13, additional details of a motor controller 1300 will be described in accordance with at least some embodiments of the present disclosure. The motor controller 1300 may be similar or identical to controller 720 or any other motor control element described herein. As can be appreciated, a vehicle 100 may comprise a single controller 1300 or multiple controllers 1300 without departing from the scope of the present disclosure.

In some embodiments, the motor controller 1300 itself may be a source of electromagnetic radiation/signaling. In traditional electric vehicles, a motor controller is known to create noise on its own, regardless of whether or not the controller is currently driving a motor. With this knowledge, operational parameters of the motor controller 1300 could be controlled to enable the motor controller to emit an electromagnetic signal. This emitted signal may be used to communicate information or otherwise authenticate the vehicle 100 to a receiving entity.

The controller 1300 is shown to include a motor speed controller 1308, a message manager 1312, a signal frequency-to-data mapping unit 1316, a motor decoupling manager 1320, an optional driver circuit 1324, a motor speed-to-signal frequency mapping unit 1328. The mapping units 1316, 1328 may be implemented as simple tables stored in memory of the controller 1300 or the mapping units 1316, 1328 may be made accessible to the motor speed controller 1308 and/or message manager 1312 via a database lookup mechanism.

The motor speed controller 1308 is connected to the winding(s)/coil(s) 1304 of the motor 712, 1200 whereas the motor decoupling manager 1320 is connected to the coupler 1240. As the name suggests, the motor decoupling manager 1320 may correspond to an electromechanical element that selectively couples and/or decouples the motor 712, 1200 from the drive shaft 1244. For instance, the motor decoupling manager 1320, in response to determining that a message is to be sent via the motor 712, 1200, may physically decouple the motor 712, 1200 from the drive shaft 1244 enabling the motor speed controller 1308 to adjust the rotors 1208 rotational speed for the purposes of sending an electromagnetic signal instead of for the purposes of turning the drive shaft 1244. As can be appreciated, the motor 712, 1200 may be capable of being decoupled from the drive shaft 1244 automatically when the vehicle 100 is parked, stopped, or otherwise running idle (meaning that the motor is turning but the wheels 220 are not)—although such a configuration is not required. During this time, it may be possible to utilize the motor speed controller 1308 to transmit one or more messages via the electromagnetic fields created by the motor 712, 1200. When the coupler 1240 has the motor 712, 1200 coupled to the drive shaft 1244, then the motor speed controller 1308 may control the speed of the motor 712, 1200 according to driving instructions received from the driver of the vehicle (whether automated or manual instructions) to help adjust the overall speed with which the wheels 220 rotate. Accordingly, the motor speed controller 1308 may provide a mechanism for adjusting the driving speed of the vehicle 100 as well as a mechanism for controlling one or more messages that are transmitted via the motor 712, 1200.

The operation of the motor speed controller 1308 may follow traditional models when the controller 1308 is operating as a vehicle speed controller. However, when the motor controller 1300 is used to transmit one or more messages via the motor, the motor speed controller 1308 may leverage functionality of a message manager 1312 to help determine the speed with which the rotor 1208 should be rotated. In particular, the message manager 1312 may reference the mapping units 1316, 1328 to convert message data into a predetermined signal frequency of set of signal frequencies (e.g., via mapping unit 1316), which can then be converted into motor rotation speed (e.g., via mapping unit 1328). Once the message manager 1312 has determined an appropriate motor speed to convey the message data received via the external control signal 724, the message manager 1312 may inform the motor speed controller 1308 to adjust the motor control signal 732 in accordance with the desired motor speed. The motor speed controller 1308 may provide the motor control signal 732 to the power converter 708, which adjusts the current provided to the motor 712, 1200. This adjusted current will adjust the overall motor rotational speed, which adjusts the frequency of the electromagnetic signal emitted by the motor 712, 1200. As can be appreciated, this motor speed controller 1308 may control the motor 712, 1200 using the message logic received from the message manager 1312 while the motor 712, 1200 is decoupled from the drive shaft 1244.

Alternatively or additionally, the optional driver circuit 1324 may be used to transmit signals with the windings 1304 of the motor. In other words, rather than controlling the speed of rotation of the motor, the motor controller 1300 may simply utilize the driver circuit 1324 to generate a signal that is transmittable via the antenna created by the windings/coils 1304. The driver circuit 1324 may cause a message to be transmitted via the windings coils 1304 that is modulated using amplitude modulation, frequency modulation, phase modulation, or any other signal modulation known in the art. This signal may be transmitted while the motor 712, 1200 is decoupled from the drive shaft 1244. Otherwise, the motor speed controller 1308 may be connected to the winding(s)/coil(s) 1304 of the stator 1204 for purposes of driving the drive shaft 1244. When a driver circuit 1324 is used to transmit one or more messages, it may not be necessary to utilize the mapping units 1316, 1328 since other message transmission protocols can be employed that do not necessarily rely on motor rotation speed to produce an electromagnetic signal of a predetermined frequency.

Figure 14:
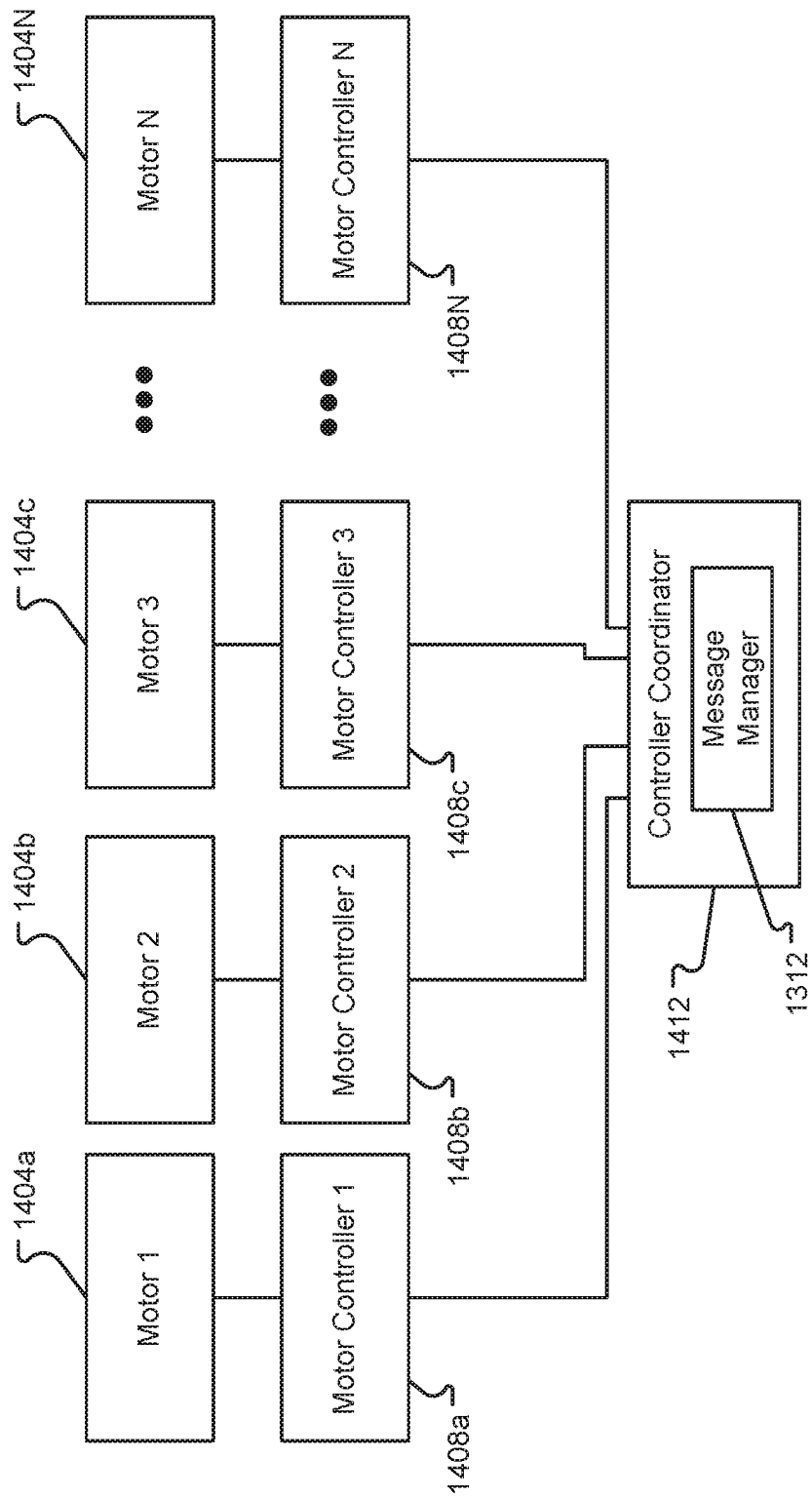
FIG. 14 is a block diagram of a controller coordinator in accordance with at least some embodiments of the present disclosure.

FIG. 14 depicts additional details of a vehicle control system in which the vehicle 100 comprises multiple motors 1404*a*-N (where N is an integer number greater than or equal to one) and a corresponding set of individual motor controllers 1408*a*-N, which are collectively controlled by a controller coordinator 1412. As can be appreciated, the controllers 1408*a*-N may be similar or identical to the controller 1300 described in FIG. 13. Likewise, the motors 1404*a*-N may be similar or identical to any of the motors described herein. It should further be appreciated that some or all of the controller 1300 components depicted in FIG. 13 can be individually provided in each of the controllers 1408*a*-N. Alternatively or additionally, one or more of the controller 1300 components can be provided solely in the controller coordinator 1412 without departing from the scope of the present disclosure.

In embodiments where the vehicle 100 comprises multiple motors 1404*a*-N and multiple controllers 1408*a*-N, the motors 1408*a*-N may have their own motor speed controllers 1308. However, the controller coordinator 1412 may be provided with a centralized message manager function 1312 that provides each of the controllers 1408*a*-N different (or the same) instructions for transmitting an electromagnetic signal via a corresponding motor 1404*a*-N. In other words, the message manager 1312 may determine an appropriate motor control speed for each of the motors 1404*a*-N and send instructions to each motor controller 1408*a*-N to appropriately adjust the speed of their corresponding motor 1404*a*-N in such a way that a desired message is transmitted by the vehicle 100. In some embodiments, the controller coordinator 1412 may cause each motor 1404*a*-N to rotate at a similar or substantially identical speed, thereby causing each motor 1404*a*-N to transmit an electromagnetic message of a similar or substantially identical frequency. In some embodiments, the controller coordinator 1412 may cause different motors 1404*a*-N to rotate at different speeds, thereby causing each motor 1404*a*-N to transmit an electromagnetic message of a different frequency (e.g., thereby causing the vehicle 100 to emit a multi-frequency electromagnetic message). Such a multi-frequency message may be similar to a Dual-Tone Multi-Frequency (DTMF) message format used in touch-tone telephony systems. As will be discussed in further detail herein, the message(s) generated by the motor(s) 1404*a*-N (or any other motor 212, 712, 1200) can be formatted to transmit any type of data or information. As a non-limiting example, the message(s) generated by the motor(s) can include distress information (e.g., as emitted by emergency vehicles), Vehicle Identification Number (VIN) information, vehicle route information, basic message information, vehicle status information (e.g., tire pressure, engine status, gas level, oil levels, fluid levels, etc.), and any other type of information desired. As can be appreciated, that controller coordinator 1412 may receive user inputs or the like that enable a user to transmit a message via the motor(s) to another vehicle, a traffic signal, or the like.

Figure 15:
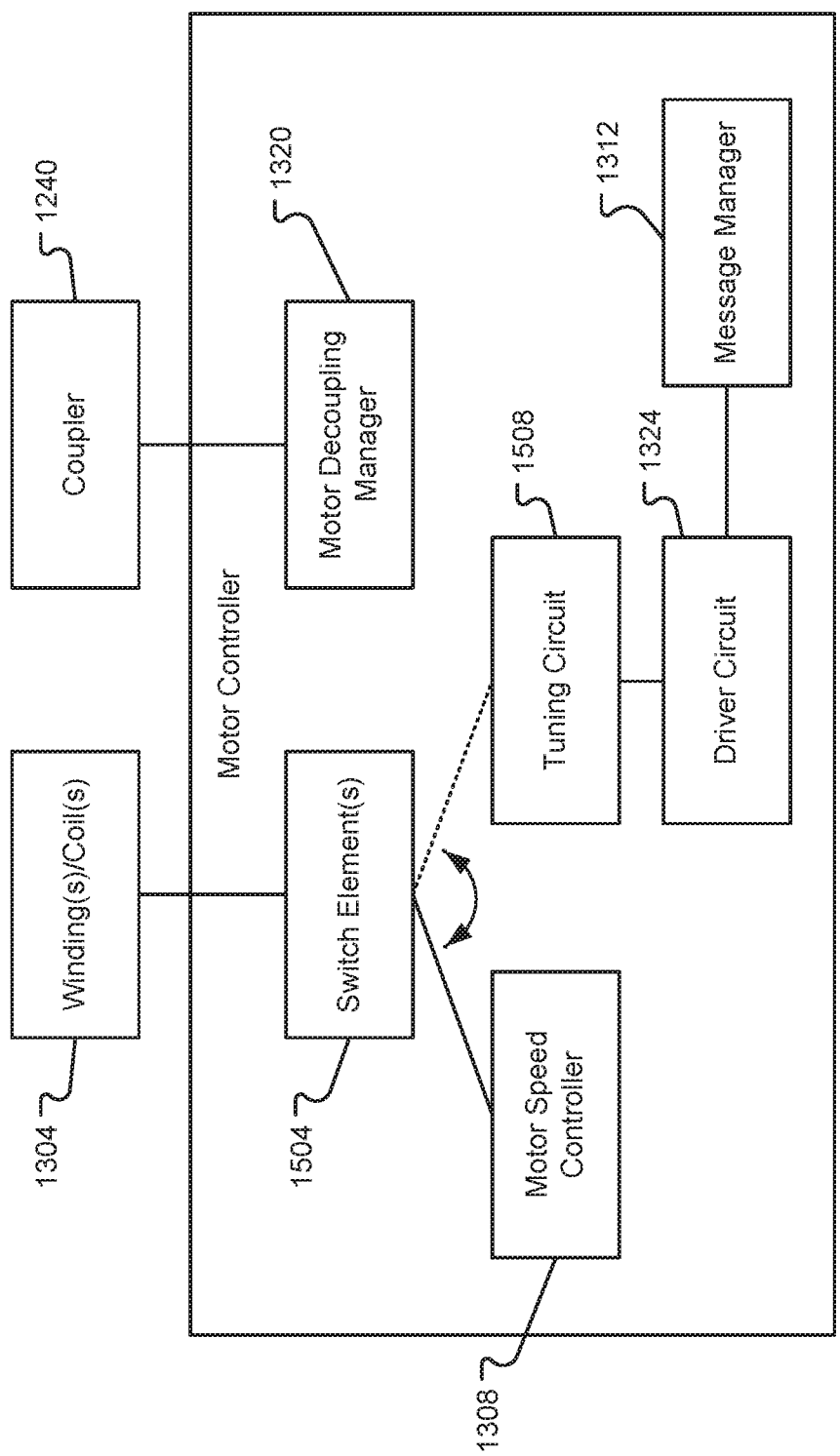
FIG. 15 is a block diagram of another motor controller in accordance with at least some embodiments of the present disclosure.

With reference now to FIG. 15, another configuration of a motor controller will be described in accordance with at least some embodiments of the present disclosure. The controller depicted in FIG. 15 may be similar or identical to controller 1300 and/or controllers 1404*a*-N. The additional feature depicted in the controller of FIG. 15 is that the controller is shown to include one or more switch elements 1504 and a tuning circuit 1508 connected between the winding(s)/coils 1304 and the optional driver circuit 1324.

The one or more switch elements 1504 may correspond to hardware and/or software switches that enable a selective connection of either the motor speed controller 1308 or the tuning circuit 1508/driver circuit 1324 to the winding(s)/coil(s) 1304. As an example, the switch elements 1504 may include one or more mechanical switches (e.g., relays, fuses, etc.) and/or one or more logical switches (e.g., transistors, logic gates, etc.). The switch elements 1504 may enable the motor speed controller 1308 to connect to the stator 1204 when the coupler 1240 engages the rotor 1208 with the drive shaft 1244. On the other hand, when the drive shaft 1244 is decoupled from the rotor 1208 via operation of the motor decoupling manager 1320, the switch elements 1504 may enable the message manager 1312 to transmit one or more messages via the winding(s)/coil(s) 1304 by connecting the driver circuit 1324 and turning circuit 1508 to the winding(s)/coil(s) 1304.

The tuning circuit 1508 may include one or more capacitive, inductive, or resistive elements that enable the message(s) to be transmitted from the antenna created by the windings 1304 at a predetermined frequency. The driver circuit 1324 may include one or more power amplifiers, transistors, capacitors, inductors, and resistors that enable modulation of a signal emitted by the winding(s)/coil(s) 1304. Any type of message transmission protocol or message format may be utilized by the message manager 1312, driver circuit 1324, and tuning circuit 1508. For instance, the message manager 1312, driver circuit 1324, and tuning circuit 1508 may implement communication protocols such as those described in connection with the communication subsystem 900 of FIG. 9. Once it is desired to move the vehicle 100, the switch elements 1504 may reconnect the motor speed controller 1308 to the stator 1204 and disconnect the tuning circuit 1508/driver circuit 1324 from the stator 1204. The motor decoupling manager 1320 may simultaneously couple the drive shaft 1244 to the rotor 1208 via the coupler 1240, thereby enabling the wheels 220 to be powered by the motor.

Figure 16:
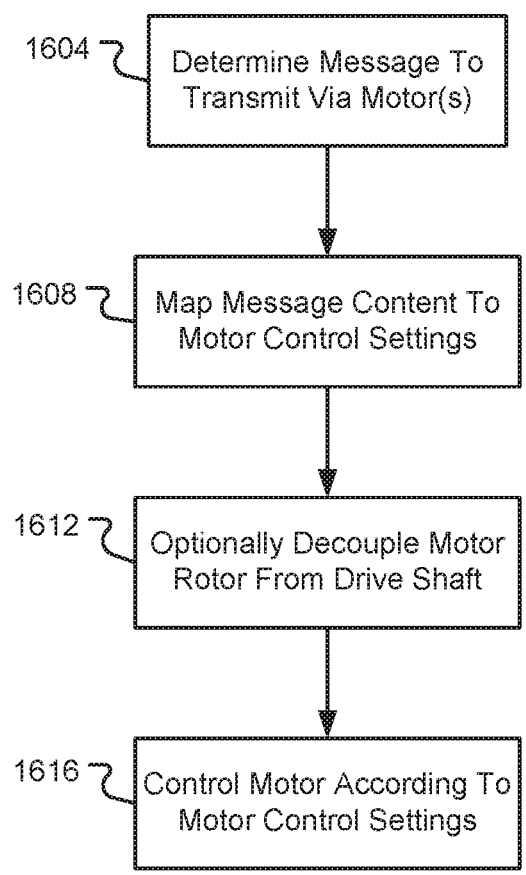
FIG. 16 is a flow diagram depicting a first motor control method in accordance with at least some embodiments of the present disclosure.

With reference now to FIG. 16, a first method of transmitting a message via one or more motors of a vehicle 100 will be described in accordance with at least some embodiments of the present disclosure. The method depicted in FIG. 16 can be performed using one or multiple motors. Furthermore, the motor(s) used to implement the method of FIG. 16 can be any one of the motors depicted and/or described herein.

The method begins when it is determined that a message is to be transmitted via the one or more motors (step 1604). The message may correspond to a predetermined message that is generated automatically by operational logic of the vehicle 100 or the message may include custom content generated by a user/driver of the vehicle 100. As non-limiting examples, the message content may include a VIN number of the vehicle 100, distress/emergency information, passenger identification information, passenger status information, vehicle route information, vehicle status information, custom message content (e.g., a message desired to be transmitted to a driver of another vehicle), combinations thereof, and the like. In some embodiments, the message may be used to authenticate the vehicle 100 to a receiving entity. As such, the message may be formatted to either identify the vehicle 100 to the receiving entity or prove to the receiving entity that the vehicle 100 is an authentic and, therefore, trusted vehicle 100 that is allowed to exchange communications with the receiving entity. Said another way, the message(s) transmitted by the vehicle 100 may correspond to information-bearing messages and/or to messages used for authentication purposes (e.g., as proof of a known secret or protocol).

The message content can be mapped to one or more motor control settings (step 1608). In some embodiments, the message content is mapped to motor control settings (e.g., motor speed) via reference to the mapping units 1316, 1328. In such an embodiment, the message content can be mapped to a signal frequency, which is subsequently mapped to a predetermined motor speed. Alternatively, the message content can be mapped to a particular message format (e.g., an NFC format, a BLE format, a WiFi format, etc.). The message manager 1312, driver circuit 1324, and other components of the controller 1300 can be used to generate the appropriate message for transmission via the winding(s)/coil(s) 1304 of the motor.

The method continues by optionally decoupling the rotor 1208 from the drive shaft 1244 (step 1612). This step may be performed automatically as a result of operating/driving the vehicle (e.g., in response to the vehicle being stopped, put into park, coasting, slowing down, or otherwise having the vehicle motor operational but the wheels 220 not being driven). Alternatively, this step may be performed in response to determining that a message is to be transmitted. In the latter scenario, the motor may be quickly decoupled from the drive shaft 1244 so as to enable a quick transmission of the message.

Once the motor is ready for message transmission, the method continues with the motor controller 1300 controlling the motor in such a way that the desired message(s) is transmitted via the motor(s) (step 1616). In some embodiments, the desired message may be transmitted multiple times (in a repeated and known pattern) to overcome potential noise or loss conditions. The message may be transmitted for a predetermined amount of time and/or until it becomes necessary to recouple the motor to the drive shaft 1244. Once transmitted, the motor may be recoupled to the drive shaft 1244 to enable driving control/acceleration of the vehicle 100.

Figure 17:
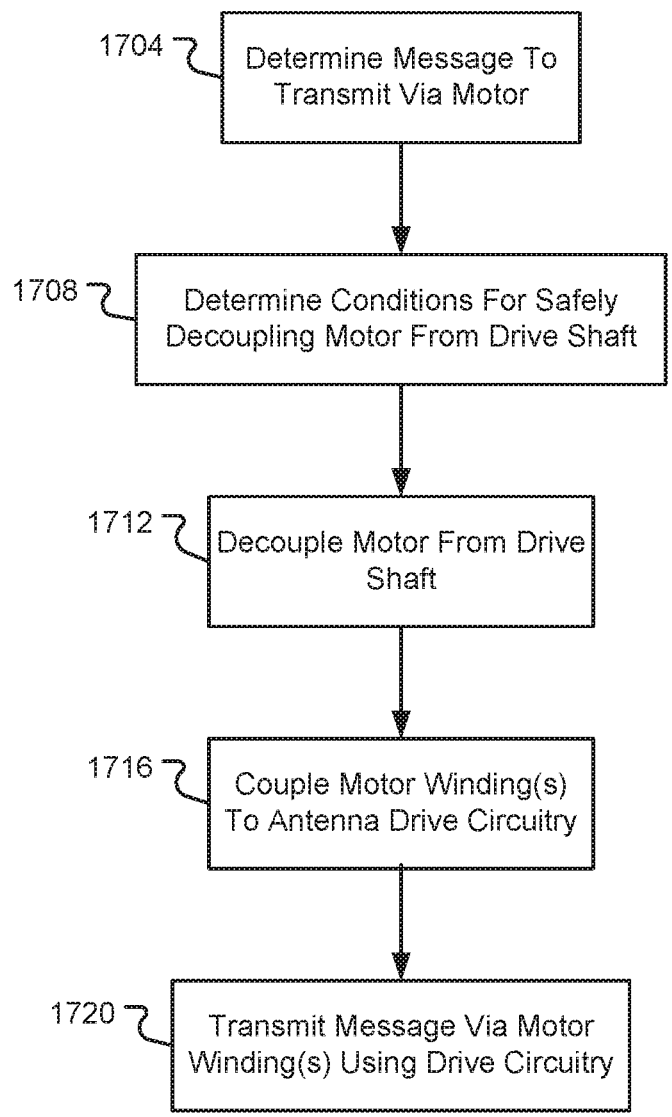
FIG. 17 is a flow diagram depicting a second motor control method in accordance with at least some embodiments of the present disclosure.

With reference now to FIG. 17, another method of utilizing a vehicle motor to transmit one or more messages will be described in accordance with at least some embodiments of the present disclosure. The method of FIG. 17 may be performed as an alternative or supplement to the method depicted and described in FIG. 16. As with FIG. 16, the method of FIG. 17 can be performed using one or multiple motors without departing from the scope of the present disclosure.

The method begins by determining that a message is to be transmitted via the vehicle's motor(s) (step 1704). The message content may be predetermined or custom generated by a driver of the vehicle.

The method continues by determining condition(s) that are required to safely decouple the motor(s) from the drive shaft 1244, thereby enabling message transmission via the motor(s) (step 1708). In some embodiments, the conditions for safely decoupling the motor(s) from the drive shaft 1244 may include conditions in which drive power is not currently desired for the wheels 220 of the vehicle. Such conditions include coasting conditions or conditions where regenerative braking is being implemented. Other conditions that are suitable for message transmission include conditions in which the vehicle 100 is parked, stopped at a traffic signal, idle, or the like.

The motor controller(s) responsible for transmitting the message(s) may continue to monitor the vehicle for satisfaction of the conditions determined in step 1708. Once the determined conditions are satisfied (e.g., the motor(s) can be safely decoupled from the drive shaft 1244), the method continues by decoupling the motor(s) from their respective drive shaft 1244 (if such an event has not already occurred) (step 1712). Then the stator windings are coupled to antenna drive circuitry (e.g., driver circuit 1324 and/or tuning circuit 1508) (step 1716), thereby enabling the motor controller to transmit the desired messages via the windings of the motor stator (step 1720). The transmitted message(s) may be formatted according to any type of message transmission protocol known or yet to be developed. As a non-limiting example, inductive coupling techniques akin to NFC can be utilized to transmit a message from the windings of the motor.

Figure 18:
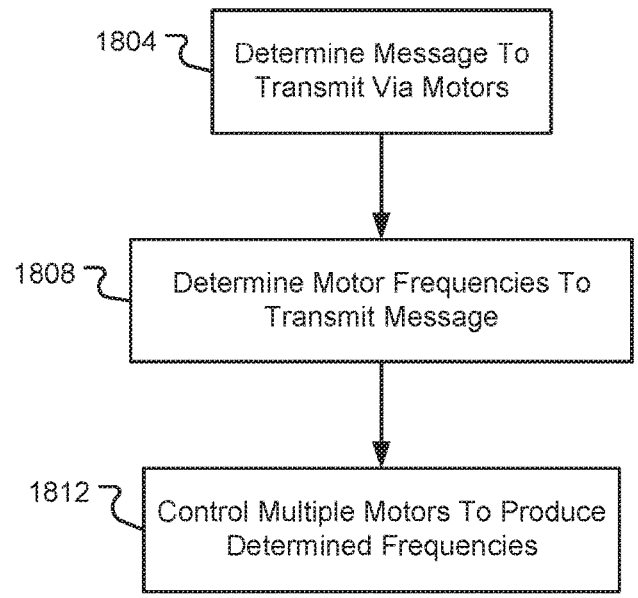
FIG. 18 is a flow diagram depicting a third motor control method in accordance with at least some embodiments of the present disclosure.
Figure 19:
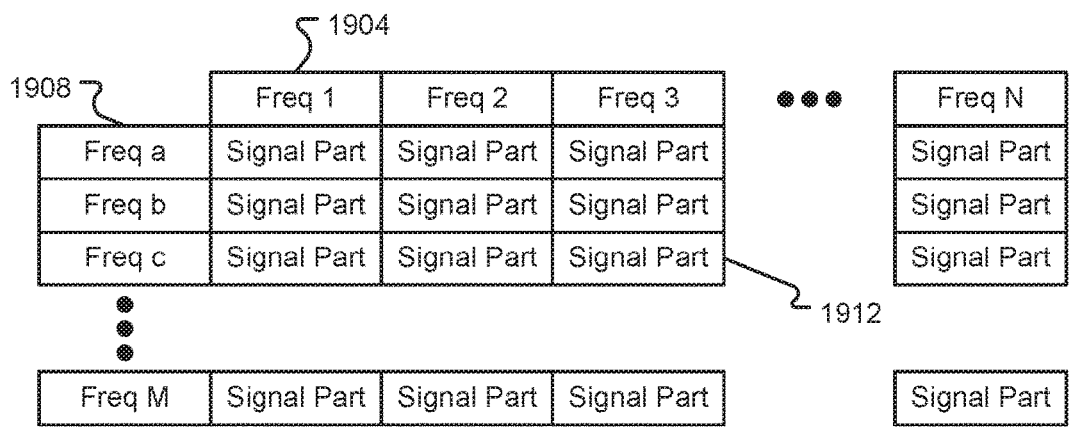
FIG. 19 is a table depicting a mapping of multiple motor signal frequencies to predetermined signal parts in accordance with at least some embodiments of the present disclosure.

With reference now to FIGS. 18 and 19, a method for controlling multiple motors to transmit a multi-frequency electromagnetic message will be described in accordance with at least some embodiments of the present disclosure. The method can be implemented using two, three, four, or more motors emitting electromagnetic signals of different (or the same) frequencies. For instance, the message transmitted by the vehicle may correspond to a DTMF or similar type of message. In other embodiments, three or more motors may emit signals of different frequencies, thereby creating a signal having three or more frequencies.

As shown in FIG. 19, a signal part 1912 may be mapped to a predetermined set of signal frequencies 1904, 1908. The information depicted in FIG. 19 may be considered an example of a signal frequency-to-data mapping unit 1316. The method of FIG. 18 begins by determining a message that is to be transmitted via the plurality of motors (step 1804). The parts of the message may be broken down into one or more signal parts 1912, that can subsequently be mapped to a set of two or more signal frequencies 1904, 1908 (step 1808). Individual motors may then be controlled to rotate at an appropriate speed to produce the desired frequencies determined in step 1808 (step 1812). As a non-limiting example, a first motor may be operated to spin at a first speed, thereby emitting a signal of a first frequency. Simultaneously, a second motor may be operated to spin at a second speed (different from the first speed), thereby emitting a signal of a second frequency (different from the first frequency). This would simply result in the vehicle 100 emitting a multi-frequency electromagnetic signal. This example could be extended to have a third motor operated to spin at a third speed (different from the first and second speeds), thereby emitting a signal of a third frequency (different from the first and second frequencies). Each combination of frequencies can be mapped to different signal parts 1912. Accordingly, even if individual motors are only capable of emitting a fixed number of frequencies (e.g., 10), the multiple combinations of frequencies can be used to produce a larger number of signal parts (e.g., predetermined numbers, characters, symbols, etc.).

It should be appreciated that any of the steps, functions, and operations discussed herein can be performed continuously and automatically, alone or in combination.

Figure 20:
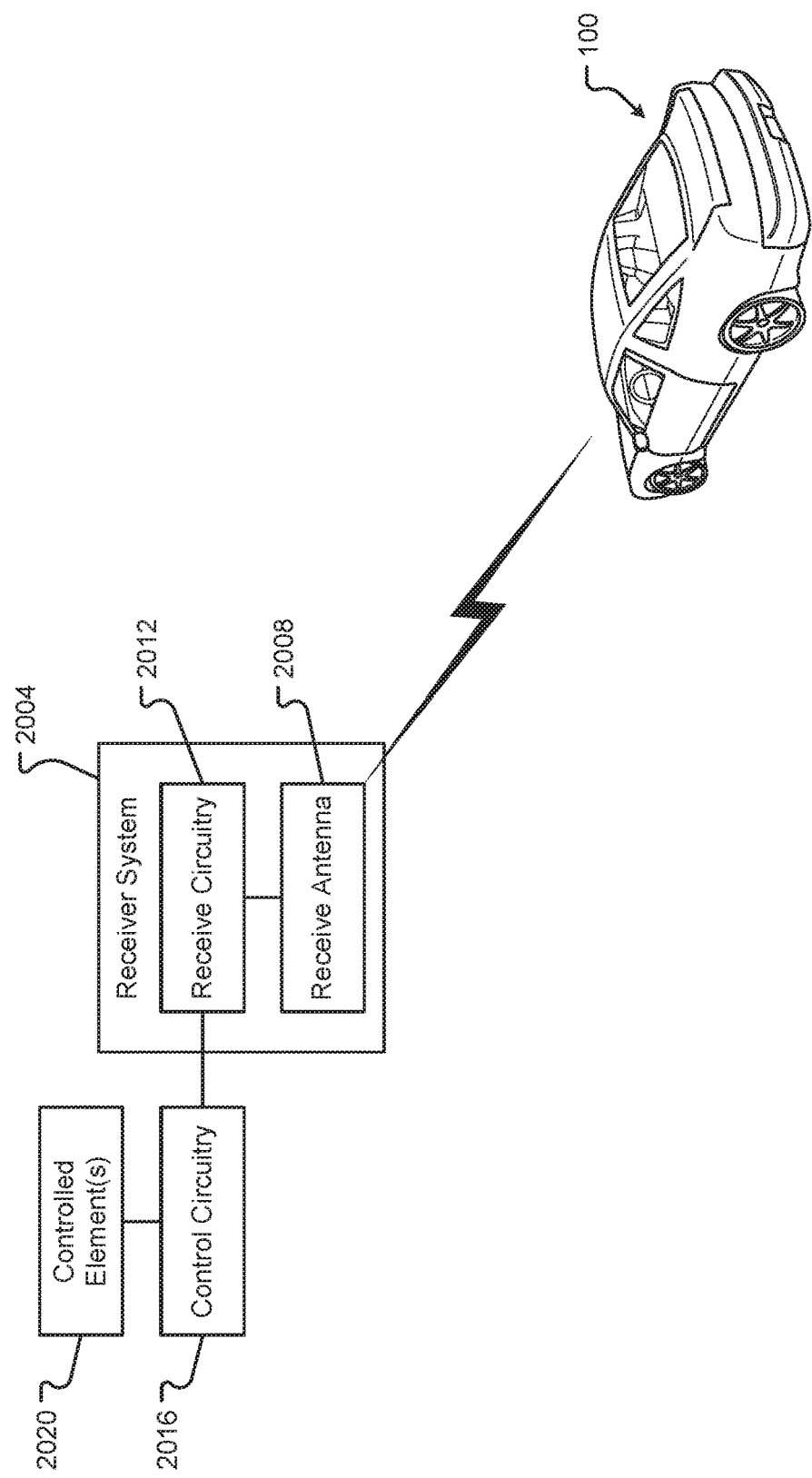
FIG. 20 is a block diagram depicting a motor signal receiver system in accordance with at least some embodiments of the present disclosure.

With reference now to FIG. 20, an illustrative receiver system 2004 designed to receive and process a message emitted by one or more motors of a vehicle 100 will be described in accordance with at least some embodiments of the present disclosure. The illustrative receiver system 20004 can be provided as part of another vehicle, as part of a traffic signal (e.g., a stop light), and/or as part of a system that controls the coordinated movement of multiple vehicles.

The receiver system 2004 is shown to include a receive antenna 2008 and receive circuitry 2012. The receiver system 2004 may be coupled to control circuitry 2016, which is capable of controlling one or more controlled elements 2020. As an example, the receiver system 2004 may be implemented as one or more microprocessors having embedded receive antennas 2008. The one or more microprocessors can be coupled electrically to the control circuitry 2016, which is responsive to the received signals and is configured to control the one or more controlled elements 2020 according to the received signals.

The receive antenna 2008 may comprise an antenna or multiple antennas that are capable of detecting a signal emitted by a motor of the vehicle 100. As an example, the antenna 2008 may have a geometry and number of turns that enable the antenna to detect and convert the electromagnetic signal emitted by the vehicle 100 into an electrical signal. The electrical signal produced at the receive antenna 2008 may be provided to receive circuitry 2012 (which may include a tuning circuit, a demodulator, or any other processing component described in connection with the communication subsystem 900). The receive circuitry 2012 may convert the electrical signal receive from the antenna 2008 into a message or set of messages that are understood by the control circuitry 2016. As an example, the message may include an instruction for the control circuitry 2016 to perform a predetermined task with the controlled elements 2020. Illustratively, the controlled elements 2020 may correspond to a traffic signal and the message received at the control circuitry 2016 may indicate that the vehicle 100 is an emergency vehicle. Such a message may cause the control circuitry 2016 to control the traffic signal in such a way that the emergency vehicle is provided priority access through a traffic intersection or the like. In other embodiments, the controlled elements 2020 may comprise a vehicle identification system and/or vehicle control system that manages the flow of vehicles over a road way. The control circuitry 2016 may be responsible for sending control signals to the controlled elements 2020 whereas the receive circuitry 2012 may be responsible for converting the received signal into a readable message that can be understood by the control circuitry 2016.

Although depicted as being external to the receiver system 2004, it should be appreciated that the control circuitry 2016 and/or controlled elements 2020 may be incorporated into the receiver system 2004 without departing from the scope of the present disclosure.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a vehicle. One non-limiting example of the vehicle includes at least one motor being configured for selective mechanical coupling with at least one drive wheel of the vehicle and a motor controller configured to provide a motor control signal to the at least one motor or an electrical component connected to the at least one motor, wherein the motor controller is further configured to utilize the at least one motor to transmit an electromagnetic signal to a receiver system.

Aspects of the above vehicle provide that the motor controller comprises a motor speed controller that selectively adjusts a rotational speed of the at least one motor thereby causing the at least one motor to emit the electromagnetic signal at a predetermined frequency.

In another aspect, the motor controller only adjusts the rotational speed of the at least one motor for purposes of causing the at least one motor to emit the electromagnetic signal in response to determining that the at least one motor is mechanically decoupled from the at least one drive wheel.

In another aspect, the motor controller references information that maps motor speed-to-signal frequency in connection with determining and adjusting the rotational speed of the at least one motor.

In another aspect, wherein the motor controller receives a motor feedback signal and an external control signal and produces the motor control signal based on the motor feedback signal and the external control signal.

In another aspect, the external control signal is received from a user input of the vehicle.

In another aspect, the motor controller comprises a switch that selectively couples driver circuitry to the at least one motor dependent upon whether or not the at least one motor is mechanically coupled with the at least one drive wheel.

In another aspect, the driver circuitry causes a winding of the at least one motor to be utilized as an antenna and transmit a message when the at least one motor is mechanically decoupled from the at least one drive wheel.

In another aspect, the message transmitted by the winding of the at least one motor is modulated by at least one of amplitude, frequency, and phase.

In another aspect, the motor controller comprises a motor decoupling manager that selectively couples and decouples the at least one motor from a drive shaft.

In yet another aspect, a motor controller is provided for use in an electric vehicle. The motor controller may include a motor speed controller configured to provide motor control signals that adjust a rotational speed of a motor and a motor decoupling manager configured to selectively mechanically couple and decouple the motor from a drive shaft, wherein the motor speed controller is further configured to utilize the motor to transmit an electromagnetic signal when the motor is mechanically decoupled from the drive shaft.

The motor controller may be configured to further include a driver circuit configured to format the electromagnetic signal into a message according to a predetermined communication protocol. Alternatively or additionally, the motor controller may include a switch element that selectively couples and decouples the driver circuit from the motor. Alternatively or additionally, the motor controller may include a message manager configured to receive data that describes a message to be transmitted and, based on the received data, determine a motor speed that communicates at least part of the message via the electromagnetic signal. The message manager may instruct the motor speed controller to adjust the motor to rotate at the determined motor speed, thereby enabling the motor to emit the electromagnetic signal at a predetermined frequency.

In yet another embodiment of the present disclosure, a system is provided for transmitting a message, where the system includes a motor configured to be mechanically coupled to and decoupled from a first drive wheel of a vehicle and a motor controller in communication with the motor, the motor controller being positioned in a feedback control loop for the motor and further receiving an external input signal that causes the motor controller to utilize the motor for transmission of an electromagnetic signal.

The above-described system may further include a second motor and a second motor controller in communication with the second motor, the second motor controller being positioned in a feedback control loop for the second motor and further receiving a second external input signal that causes the second motor controller to utilize the second motor for transmission of the electromagnetic signal or a second electromagnetic signal. In some embodiments, the system may further include a controller coordinator that coordinates operation of the motor controller and the second motor controller such that the motor controller and second motor controller are configured to simultaneously operate the motor and second motor, respectively, in such a way that the electromagnetic signal is transmitted. Alternatively or additionally, the electromagnetic signal emitted by the vehicle may comprise a multi-frequency signal. Alternatively or additionally, the motor is rotated at a first speed, thereby causing the motor to emit a signal of a first frequency, while the second motor is rotated at a second speed, thereby causing the second motor to emit a signal of a second frequency, and wherein the first and second frequencies are combined to produce the multi-frequency signal.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A vehicle, comprising:
at least one motor being configured for selective mechanical coupling with at least one drive wheel of the vehicle; and
a motor controller that provides a motor control signal to the at least one motor or an electrical component connected to the at least one motor, wherein the motor controller further utilizes the at least one motor to transmit an electromagnetic signal to a receiver system, and wherein the motor controller comprises a motor speed controller that selectively adjusts a rotational speed of the at least one motor thereby causing the at least one motor to emit the electromagnetic signal at a predetermined frequency.

2. The vehicle of claim 1, wherein the motor controller only adjusts the rotational speed of the at least one motor for purposes of causing the at least one motor to emit the electromagnetic signal in response to determining that the at least one motor is mechanically decoupled from the at least one drive wheel.

3. The vehicle of claim 1, wherein the motor controller references information that maps motor speed-to-signal frequency in connection with determining and adjusting the rotational speed of the at least one motor.

4. The vehicle of claim 1, wherein the motor controller receives a motor feedback signal and an external control signal and produces the motor control signal based on the motor feedback signal and the external control signal.

5. The vehicle of claim 4, wherein the external control signal is received from a user input of the vehicle.

6. The vehicle of claim 1, wherein the motor controller comprises a switch that selectively couples driver circuitry to the at least one motor dependent upon whether or not the at least one motor is mechanically coupled with the at least one drive wheel.

7. The vehicle of claim 6, wherein the driver circuitry causes a winding of the at least one motor to be utilized as an antenna and transmit a message when the at least one motor is mechanically decoupled from the at least one drive wheel.

8. The vehicle of claim 7, wherein the message transmitted by the winding of the at least one motor is modulated by at least one of amplitude, frequency, and phase.

9. The vehicle of claim 1, wherein the motor controller comprises a motor decoupling manager that selectively couples and decouples the at least one motor from a drive shaft.

10. A motor controller for use in an electric vehicle, the motor controller comprising:
a motor speed controller that provides motor control signals that adjust a rotational speed of a motor; and
a motor decoupling manager that selectively mechanically couples and decouples the motor from a drive shaft, wherein the motor speed controller further utilizes the motor to transmit an electromagnetic signal when the motor is mechanically decoupled from the drive shaft.

11. The motor controller of claim 10, further comprising:
a driver circuit configured to format the electromagnetic signal into a message according to a predetermined communication protocol.

12. The motor controller of claim 11, further comprising:
a switch element that selectively couples and decouples the driver circuit from the motor.

13. The motor controller of claim 10, further comprising:
a message manager configured to receive data that describes a message to be transmitted and, based on the received data, determine a motor speed that communicates at least part of the message via the electromagnetic signal.

14. The motor controller of claim 13, wherein the message manager instructs the motor speed controller to adjust the motor to rotate at the determined motor speed, thereby enabling the motor to emit the electromagnetic signal at a predetermined frequency.

15. A system for transmitting a message, the system comprising:
   a motor configured to be mechanically coupled to and decoupled from a first drive wheel of a vehicle; and
   a motor controller in communication with the motor, the motor controller being positioned in a feedback control loop for the motor and further receiving an external input signal that causes the motor controller to utilize the motor for transmission of an electromagnetic signal.

16. The system of claim 15, further comprising:
   a second motor; and
   a second motor controller in communication with the second motor, the second motor controller being positioned in a feedback control loop for the second motor and further receiving a second external input signal that causes the second motor controller to utilize the second motor for transmission of the electromagnetic signal or a second electromagnetic signal.

17. The system of claim 16, further comprising:
   a controller coordinator that coordinates operation of the motor controller and the second motor controller such that the motor controller and second motor controller are configured to simultaneously operate the motor and second motor, respectively, in such a way that the electromagnetic signal is transmitted.

18. The system of claim 17, wherein the electromagnetic signal comprises a multi-frequency signal.

19. The system of claim 18, wherein the motor is rotated at a first speed, thereby causing the motor to emit a signal of a first frequency, wherein the second motor is rotated at a second speed, thereby causing the second motor to emit a signal of a second frequency, and wherein the first and second frequencies are combined to produce the multi-frequency signal.

* * * * *

UNITED STATES PATENT AND TRADEMARK OFFICE
CERTIFICATE OF CORRECTION

PATENT NO. : 10,363,938 B2  
APPLICATION NO. : 15/392065  
DATED : July 30, 2019  
INVENTOR(S) : Austin L. Newman It is certified that error appears in the above-identified patent and that said Letters Patent is hereby corrected as shown below:

On the Title Page

Under abstract, "19 Claims, 18 Drawing Sheets" should read --20 Claims, 18 Drawing Sheets--.

In the Claims

Column 34, Line 22, insert the following text:
--20. The system of claim 15, wherein the motor controller comprises a motor decoupling manager that selectively couples and decouples the motor from a drive shaft associated with the first drive wheel.--.

Signed and Sealed this
Eleventh Day of February, 2020

Andrei Iancu
*Director of the United States Patent and Trademark Office*